US011068881B2

(12) United States Patent
Beye

(10) Patent No.: US 11,068,881 B2
(45) Date of Patent: Jul. 20, 2021

(54) SYSTEM FOR RESOURCE DISTRIBUTION WITHIN AN OFFLINE ENVIRONMENT

(71) Applicant: Bank of America Corporation, Charlotte, NC (US)

(72) Inventor: Rick A. Beye, Highland Beach, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 32 days.

(21) Appl. No.: 16/578,020

(22) Filed: Sep. 20, 2019

(65) Prior Publication Data

US 2021/0090066 A1 Mar. 25, 2021

(51) Int. Cl.
*G06Q 40/00* (2012.01)
*G06Q 20/32* (2012.01)
(Continued)

(52) U.S. Cl.
CPC ......... *G06Q 20/3278* (2013.01); *G06Q 20/00* (2013.01); *G06Q 20/3674* (2013.01);
(Continued)

(58) Field of Classification Search
CPC ............................ G06Q 20/3278; G06Q 20/40
(Continued)

(56) References Cited

U.S. PATENT DOCUMENTS 6,422,462 B1 7/2002 Cohen
8,682,802 B1 3/2014 Kannanari
(Continued)

FOREIGN PATENT DOCUMENTS

| WO | 2008093140 A2 | 8/2008 |
| WO | 2010126509 A2 | 11/2010 |
| WO | 2016134016 A1 | 8/2016 |

OTHER PUBLICATIONS

Author: M. Markovic; IEEE—14 th International Workshop on systems, signals and Image Processing: Data Protection Techniques, Cryptographic Protocols and PKI systems in Modern Computer Networks. pp. 14-23 (Year: 2007).*

*Primary Examiner* — Bruce I Ebersman
*Assistant Examiner* — John A Anderson
(74) *Attorney, Agent, or Firm* — Michael A. Springs; Moore & Van Allen PLLC; Nicholas C. Russell

(57) ABSTRACT

Embodiments of the present invention provide a system for resource distribution within an offline environment. A merchant device internally stores a repository of reference codes and managing entity public keys that are paired with managing entity private keys. The user requests an amount of resources for offline exchange from the managing entity system. The managing entity system transmits certain authorization and encryption information to a user device. When the user device receives an exchange prompt from the computing device of the merchant through near field communication, it generates a digital token incorporating layers of content encryption ending with a managing entity's private key. The encrypted token and reference code are transmitted via near field communication to the merchant device. The merchant device matches the reference code to the managing entity public key and decrypts portions of the token with the managing entity public key to acquire the usable exchange information.

15 Claims, 7 Drawing Sheets

(51) Int. Cl.
  *G06Q 20/36*  (2012.01)
  *H04L 9/32*  (2006.01)
  *G06Q 20/38*  (2012.01)
  *G06Q 20/00*  (2012.01)

(52) U.S. Cl.
  CPC ....... *G06Q 20/3678* (2013.01); *G06Q 20/388* (2013.01); *G06Q 20/3829* (2013.01); *H04L 9/3297* (2013.01)

(58) Field of Classification Search
  USPC .......................................................... 705/41
  See application file for complete search history.

(56) References Cited

U.S. PATENT DOCUMENTS

| | | |
|---|---|---|
| 9,195,984 B1 | 11/2015 | Spector et al. |
| 2008/0319905 A1 | 12/2008 | Carlson |
| 2009/0210315 A1 | 8/2009 | Jean et al. |
| 2011/0208659 A1 | 8/2011 | Easterly et al. |
| 2011/0251892 A1 | 10/2011 | Laracey |
| 2012/0150669 A1 | 6/2012 | Langley et al. |
| 2012/0209630 A1 | 8/2012 | Ihm et al. |
| 2012/0290478 A1 | 11/2012 | Crofts et al. |
| 2012/0316992 A1 | 12/2012 | Oborne |
| 2014/0344153 A1 | 11/2014 | Raj et al. |
| 2015/0213435 A1 | 7/2015 | Douglas et al. |
| 2015/0254643 A1 | 9/2015 | Bondesen et al. |
| 2015/0262180 A1 | 9/2015 | Hambleton et al. |
| 2016/0210626 A1 | 7/2016 | Ortiz et al. |
| 2017/0316390 A1* | 11/2017 | Smith .................. H04L 9/3242 |
| 2018/0006821 A1 | 1/2018 | Kinagi |
| 2019/0149527 A1* | 5/2019 | John .................. H04L 63/0457 713/171 |

* cited by examiner

SYSTEM FOR RESOURCE DISTRIBUTION WITHIN AN OFFLINE ENVIRONMENT

BACKGROUND

Current digital exchange techniques are constrained by requiring the computing devices that are communicating the digital exchange to be connected to online exchange systems and networks. Universal adoption of digital exchange mechanisms requires exchanges to be authenticated and accepted when neither of the exchanging computing devices are connected to their respective online systems and networks. As such, a need exists to break the reliance on continuous connectivity to online systems between computing devices that engage in digital exchange.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for resource distribution within an offline environment. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve interactions between at least three entities or systems: a mobile device of a user, a managing entity system, and a computing device of a merchant. The managing entity system acquires a trusted certificate root chain from a third party publicly trusted authority that is used to generate public\private key certificates facilitating signing or encrypting elements of this invention. Based on this root chain the managing entity system populates a repository from time to time with a list of current public keys and associated reference identification codes to be shared across a plurality of customers (at any given moment in time one of the references is associated with the mobile device of the user). Next, the computing device of the merchant may store, internally so it is accessible offline, the current list of public keys acquired from the managing entity system that are each associated with a plurality of customers (including the user), where each public key is linked with its associated reference identification code of one of the plurality of customers. The list of public keys may be a subset (or the entire set) of the public keys in the repository created by the managing entity system. Likewise, the associated reference identification codes plurality of customers may be a subset (or the entire set) of the reference identification codes from the managing entity's repository.

To initiate the user's involvement in this system, the mobile device of the user may implement a managing entity application stored on the mobile device of the user that requests, from the managing entity system, an amount of resources available to use in offline exchanges and a globally unique identifier (GUID) assigned to the user and unique among the managing entity's customer population. The managing entity system may process the request from the mobile device of the user by transmitting for storage on the managing entity application of the mobile device of the user, at least (1) an authorization for the mobile device of the user to exchange up to a set amount of resources in offline exchanges, (2) a globally unique identifier (GUID) assigned to the user and unique among the managing entity's customer population (3) a managing entity private key assigned to the user (4) a reference identification code mapped to both the managing entity private key assigned to the user and the corresponding managing entity public key, (5) an exclusive user resource public key assigned to the user's resource account at a resource provider (6) an exchange token structure aligned with the reference identification code version, and (7) a time to live mechanism associated with the exchange token.

Once the merchant and the user have established a desired or proposed exchange or transaction, the computing device of the merchant may transmit an exchange prompt requesting an exchange token to the computing device of the user comprising an exchange amount, details about the exchange (e.g., a bill of sale), and the like (e.g., including an encryption of at least a portion of the exchange prompt using a private key of the merchant), via a near field communication channel. The mobile device of the user receives, via the near field communication channel from the computing device of the merchant, the exchange prompt.

Once the user has confirmed their desire to execute the exchange as prompted the managing entity application on the mobile device of the user may generate the exchange token using the exchange token structure consisting of a first encrypted envelope (i.e., encrypted by the user's resource public key) comprising at least (1) an exchange amount (i.e., from the remaining available user resources), (2) an exchange timestamp, (3) a time to live expiration arising out of the exchange timestamp, and (4) information from the merchant's exchange prompt including the encrypted portion; and a second encrypted envelope (the "exchange token") (i.e., encrypted by the managing entity application's private key assigned to the user and corresponding to the transmitted reference identification code) comprising at least (1) the first encrypted envelope, (2) the exchange amount, (3) the exchange timestamp, (4) the exchange token expiration arising out of the exchange timestamp, and (5) a hashed value of the first encrypted envelope's contents combined with the user's assigned GUID with the hashing mechanism known only to the managing entity.

The mobile device of the user may then transmit (1) the reference identification code, (2) the identity of the managing entity authoring the reference identification code, (3) the user's assigned GUID, and (4) the encrypted exchange token to the computing device of the merchant via a near field communication channel. The computing device of the merchant receives the transmitted reference identification code, the identity of the managing entity system, the user's assigned GUID, and the encrypted exchange token from the computing device of the user. The computing device of the merchant may then employ the reference identification code to the internally stored list of managing entity public keys to identify the managing entity public key assigned to the user. The computing device of the merchant can then decrypt the second encrypted envelope, using the identified public key of the managing entity authenticating the token.

Once the encrypted second envelope has been decrypted, the computing device of the merchant is able to identify from the contents of the exchange token (1) the first encrypted envelope (which is still encrypted), (2) the exchange amount, (3) the exchange timestamp, (4) the time to live (i.e. time to redeem by presentment) expiration arising out of the exchange timestamp, and (5) the hashed value of the encrypted token's contents (the "exchange information").

The computing device of the merchant may then determine whether the time to live expiration has been satisfied, and whether the exchange amount is acceptable for the proposed exchange. The computing device of the merchant may then transmit the exchange information to the managing entity system (or, in some embodiments, to a financial institution associated with the merchant, whereby that financial institution subsequently presents this information to the managing entity system) and requests settlement of the exchange.

The managing entity applies its hash algorithm to decompose the user GUID from the hashed content. Once the managing entity has identified and extracted this GUID of the user from the hashed content, the managing entity employs the user GUID to obtain the corresponding user resource private key (e.g., as stored in a database of the managing entity and linked with the user's GUID, or the like) to extract the contents of the first encrypted envelope.

The managing entity system may then verify the integrity of the first encrypted envelope by comparing the received hashed value of the first encrypted envelope to the expected hashed value of the contents of the first encrypted envelope. Finally, the managing entity system transmits the exchange amount from an account associated with the user to an account associated with the merchant.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
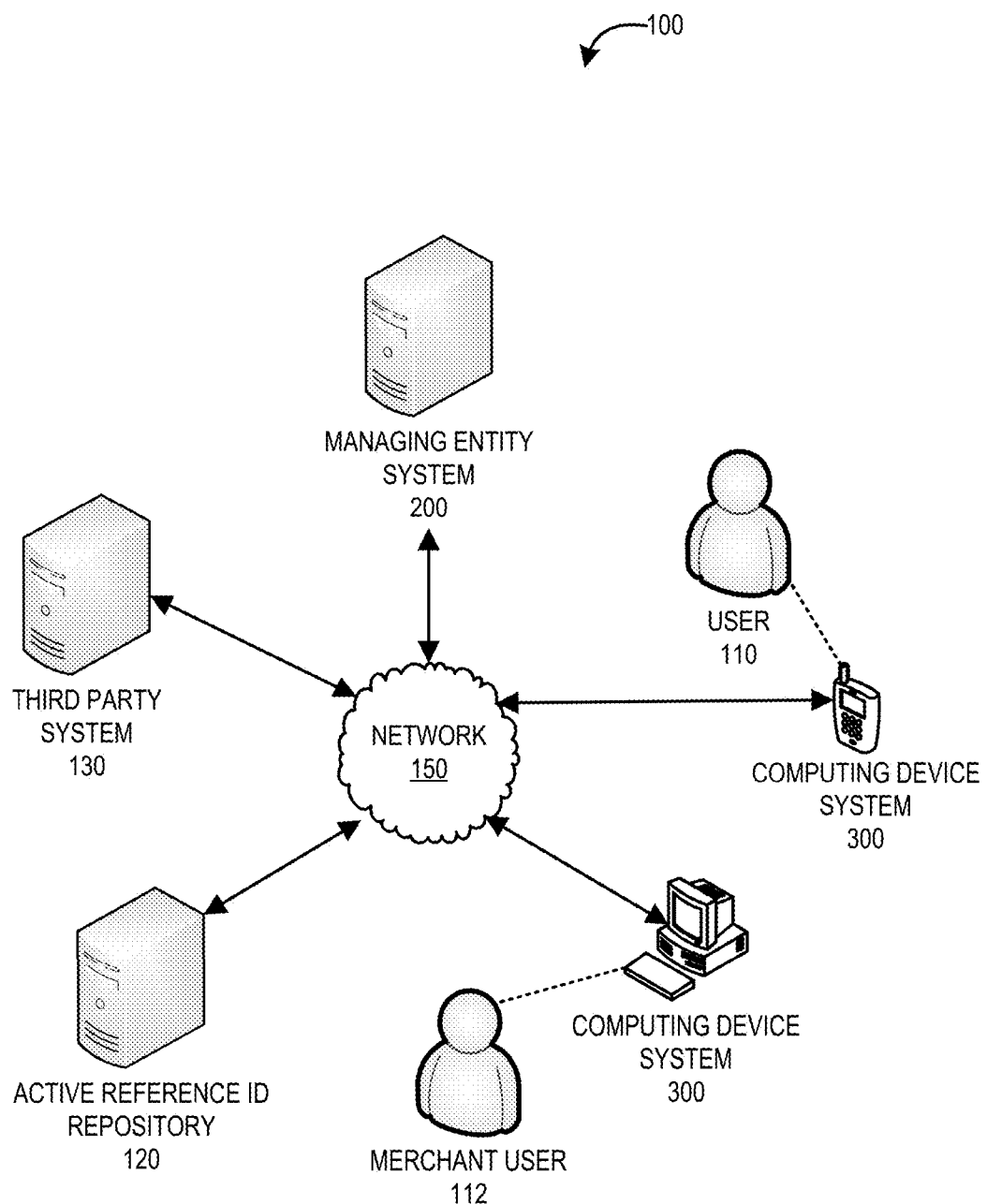
Figure 2:
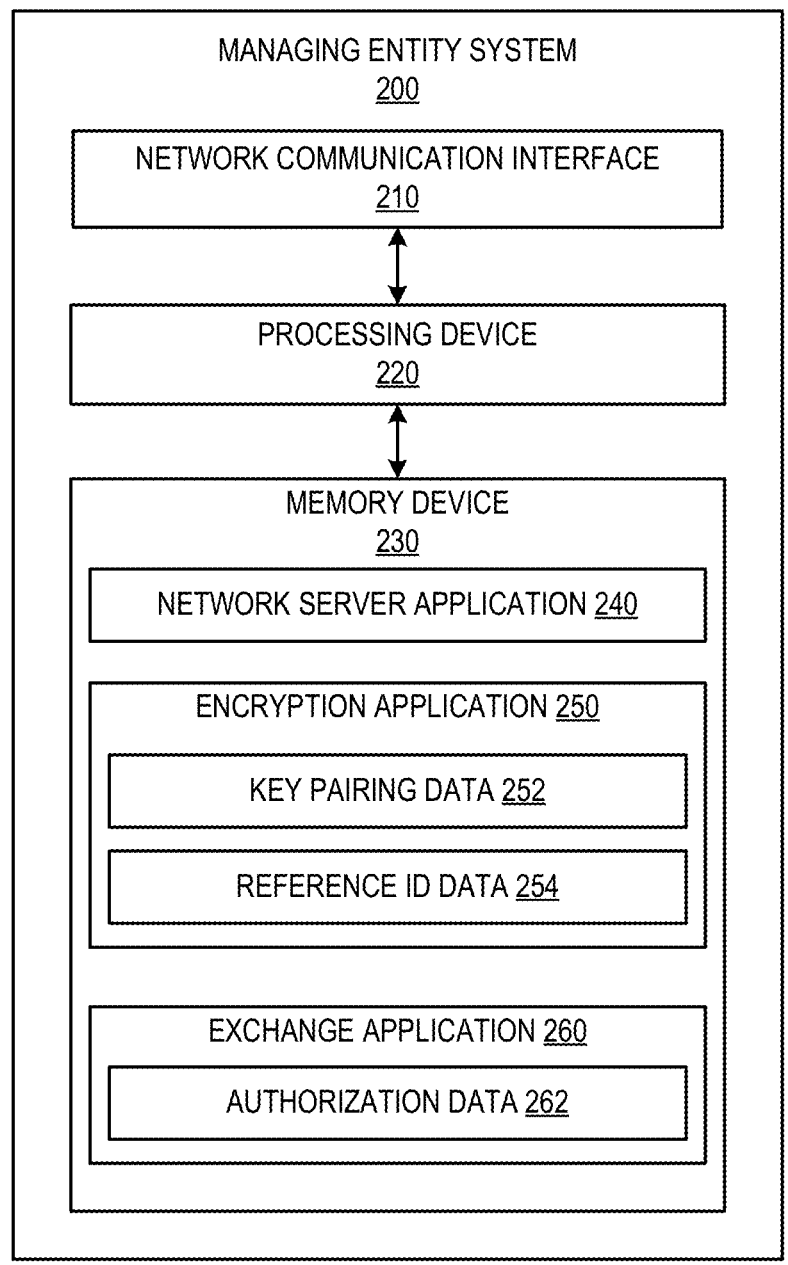
Figure 3:
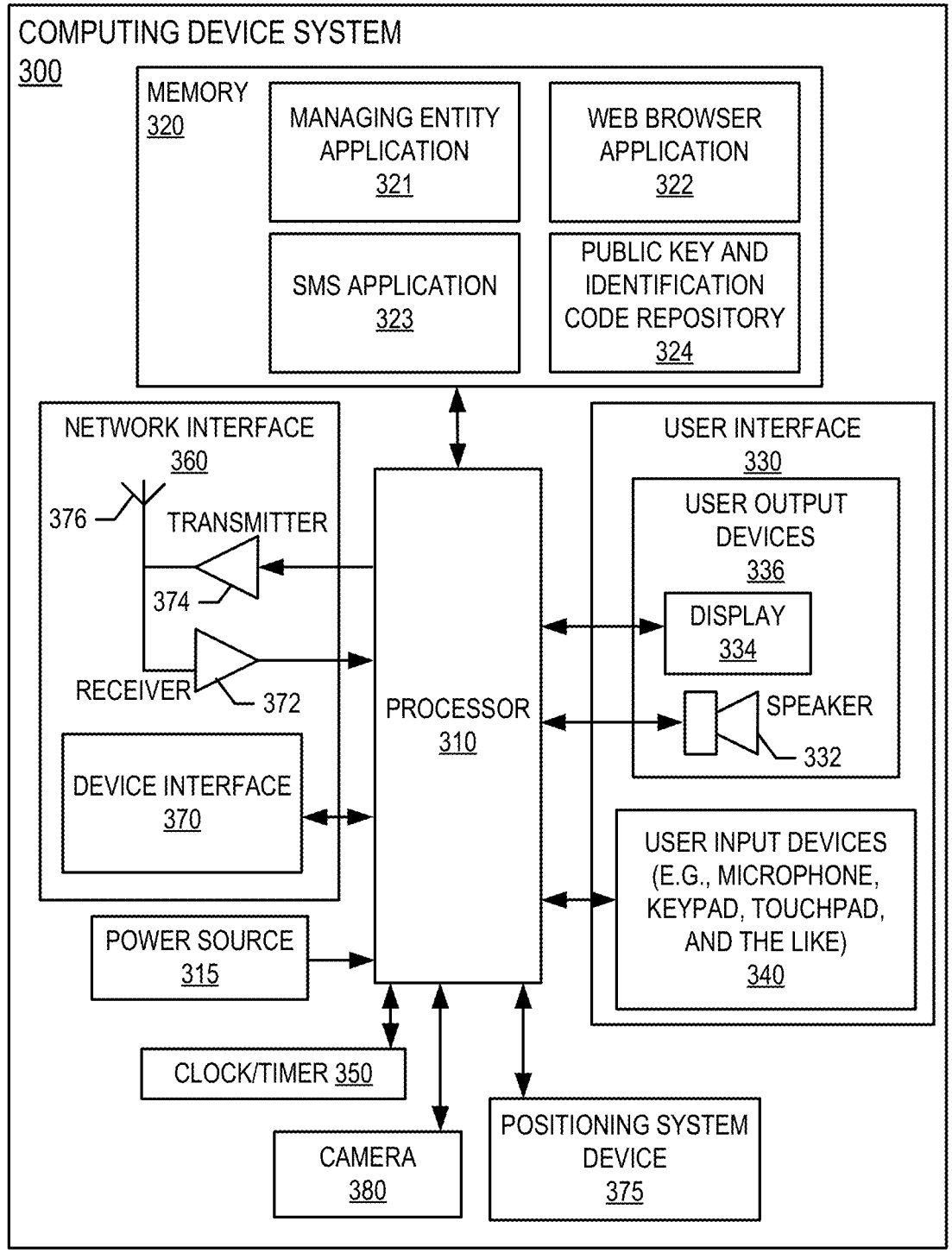
Figure 4:
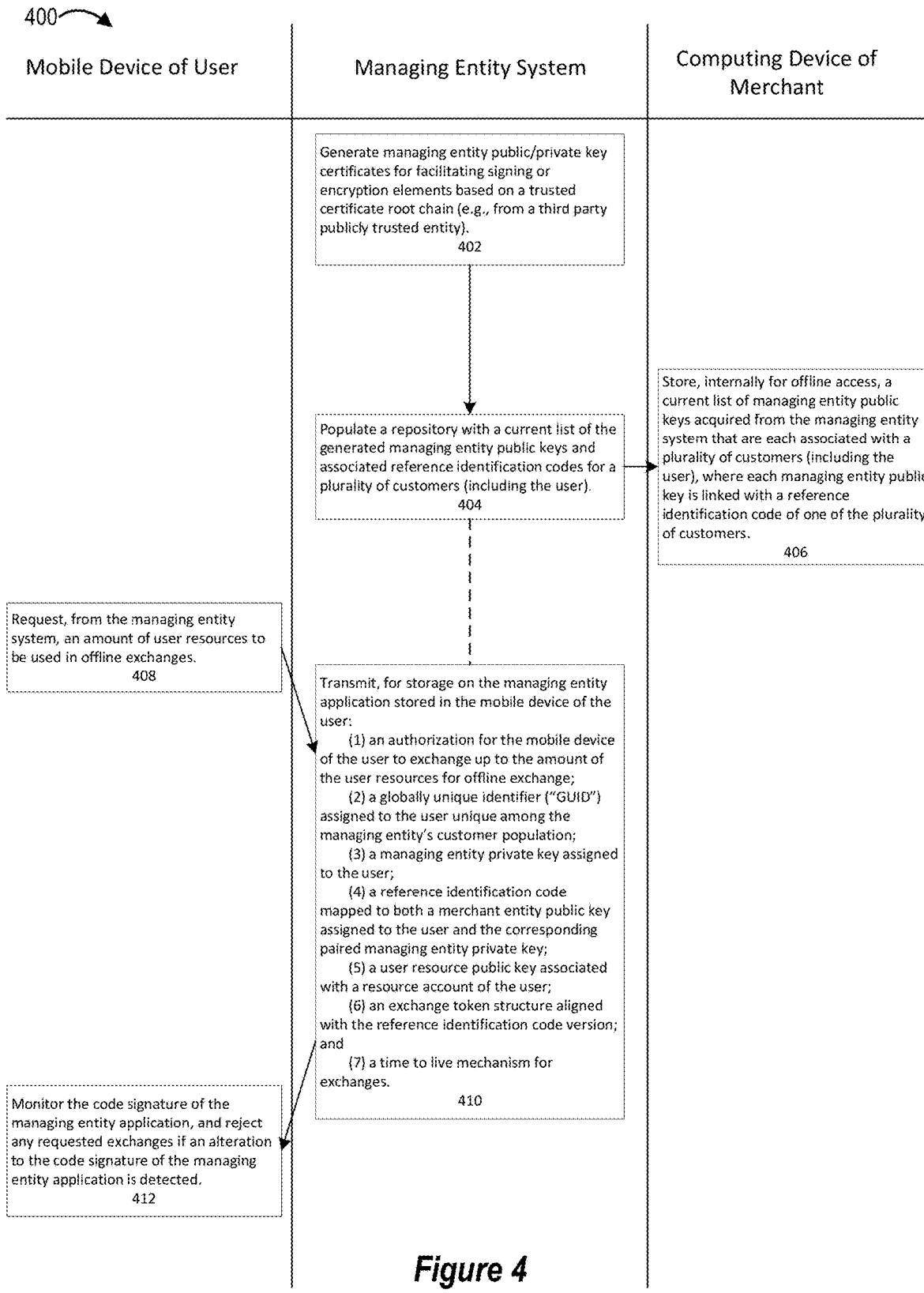
Figure 5A:
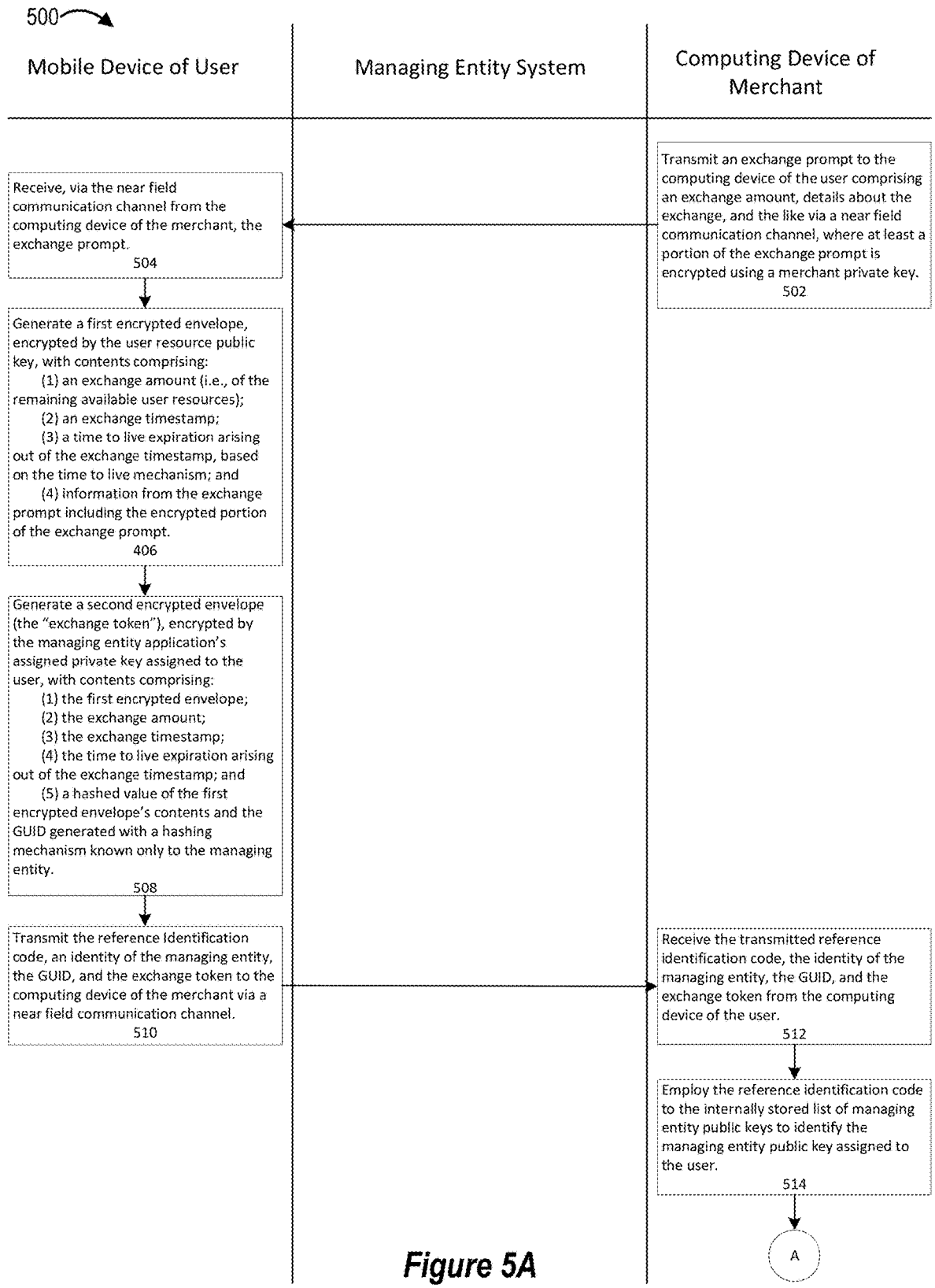
Figure 5B:
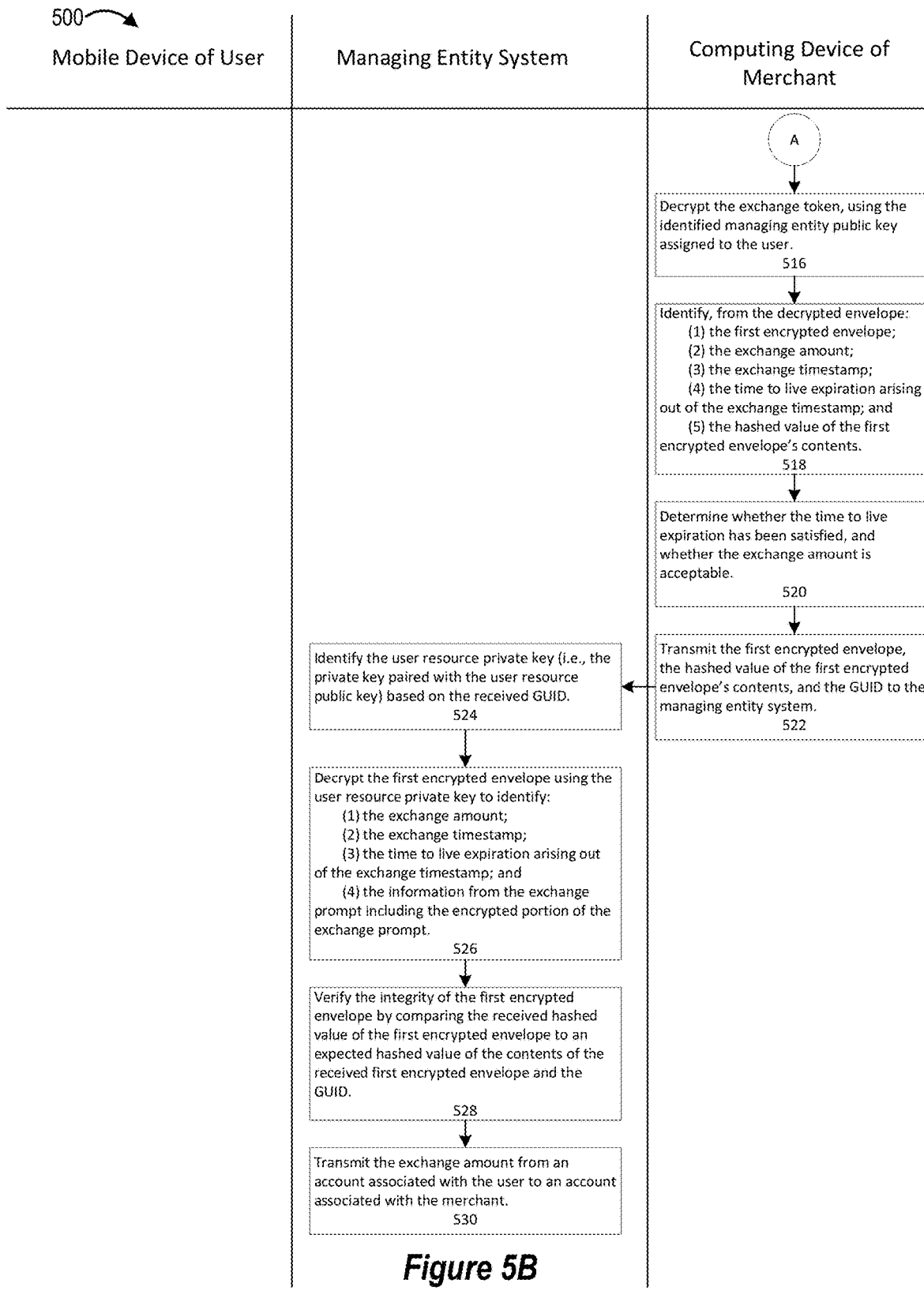
Figure 6:
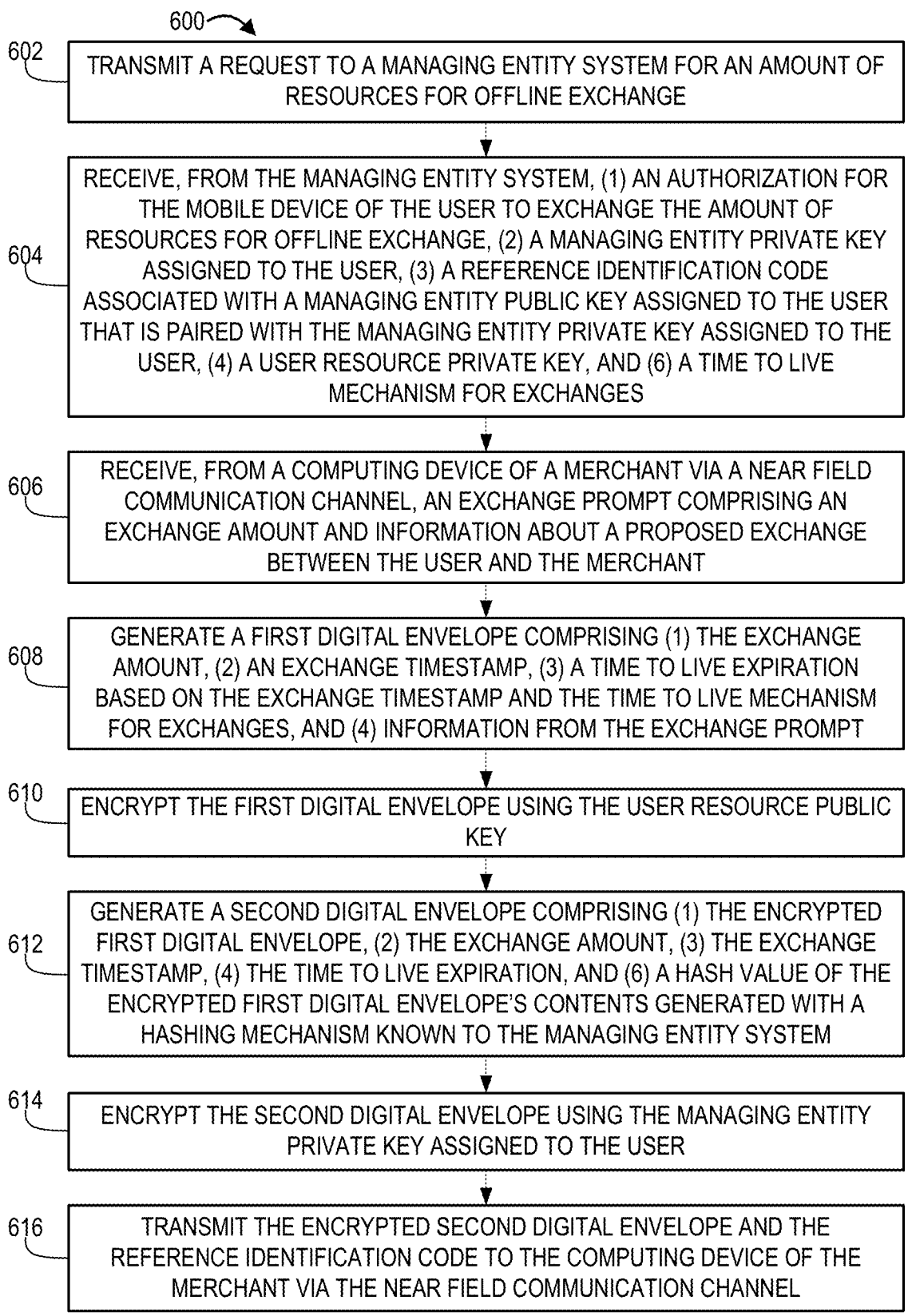

Having thus described embodiments of the invention in general terms, reference will now be made the accompanying drawings, wherein:

FIG. 1 provides a block diagram illustrating a system environment for resource distribution within an offline environment, in accordance with an embodiment of the invention;

FIG. 2 provides a block diagram illustrating the managing entity system of FIG. 1, in accordance with an embodiment of the invention;

FIG. 3 provides a block diagram illustrating the computing device system of FIG. 1, in accordance with an embodiment of the invention;

FIG. 4 provides a flowchart illustrating a preliminary process for resource distribution within an offline environment, in accordance with an embodiment of the invention;

FIGS. 5A and 5B provide a flowchart illustrating a process for resource distribution within an offline environment, in accordance with an embodiment of the invention; and FIG. 6 provides a flowchart illustrating a process for resource distribution within an offline environment, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for resource distribution within an offline environment. This invention enables such exchanges (e.g., payments) to occur by providing a means to generate a restricted negotiable token based on the full faith and credit of the financial institution (e.g., a managing entity) authorizing the creation and disbursement of that token. This solution allows people to consume and transact even on low price points point in volume, even when neither party has connection to any sort of cloud service that normally is required for such exchanges. Currently, parties have electronic wallets with various resources that mask the resource identity, but these parties are relying on information in cloud services to securely and accurately perform the exchanges at the time of exchange. As described herein, this invention breaks the requirement that either party is bound to a cloud connection at the time of exchange. Instead, this invention creates a conduit that allows an exchange to occur in an offline environment.

To accomplish this task, a merchant (or any receiving party) needs to know what it has received in token form from a user during an exchange, and the merchant needs to be confident that such a token is going to be respected and guaranteed for settlement purposes when the merchant presents the token for reimbursement. Therefore, the merchant needs to know which entity has issued the managing entity public key, which can be accomplished through the provision of a reference identification code tied to the managing entity that issued the public key, and/or through the provision of a managing entity public key associated with the reference identification code that is known to be associated with the managing entity. Furthermore, certain asymmetric key encryption schemes and digital key signature verification schemes can be utilized to protect and/or verify the accuracy, completeness, and inherent guarantees of certain exchange information.

The invention described herein provides techniques for generating, exchanging, verifying, and processing the exchange information in a manner that satisfies the above-noted needs, even in scenarios where the computing devices of the exchanging parties are offline or otherwise not connected to any wide area networks or exchange verification services at the time of exchange. Once the exchange has occurred, the receiving party is able to present at least a portion of the received exchange token for settlement once the receiving party is back online or otherwise regains access to a wide area network or exchange verification services (e.g., its financial institution's online services).

FIG. 1 provides a block diagram illustrating a system environment 100 for resource distribution within an offline environment, in accordance with an embodiment of the invention. As illustrated in FIG. 1, the environment 100 includes a managing entity system 200, two or more computing device systems 300, an active reference ID repository, and one or more third party systems 130. One or more users 110 and/or merchant users 112 may be included in the system environment 100. In some embodiments, the user(s) 110 of the system environment 100 may be a customer of the managing entity associated with the managing entity system, whereby the managing entity system provides services related to allowing its customers to exchange resources in an offline environment. A merchant user 112 may be an individual or entity that provides goods or services to the user in exchange for resources.

The managing entity system 200, the computing device systems 300, the active reference ID repository and/or the third party system 130 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. Importantly, at certain instances during the processes described below, the communication method between two or more systems is "offline" or through a near field communication channel (e.g., via near field communication ("NFC"), via Bluetooth, via a radio-frequency identification ("RFID"), and the like) instead of through a wide area network or a global area network (including the Internet).

The managing entity system 200 may be a system owned or otherwise controlled by a managing entity to perform one or more process steps described herein. In some embodiments, the managing entity is a financial institution. In general, the managing entity system 200 is configured to communicate information or instructions with the computing device systems 300, the active reference ID repository 130, and/or the third party system 130 across the network 150. For example, the managing entity system 200 may perform one or more of the process steps described in FIG. 4A, FIG. 4B, and/or FIG. 5. Of course, the managing entity system 200 may be configured to perform (or instruct other systems to perform) one or more other process steps described herein. The managing entity system 200 is described in more detail with respect to FIG. 2.

The computing device systems 300 may be a system owned or controlled by the managing entity, a user 110, a merchant user 112 and/or a third party that specializes in executing exchanges of resources. In general, the computing device systems 300 are configured to communicate information or instructions with the managing entity system 200, one or more other computing device systems 300, the active reference Id repository 120 and/or the third party system 130 across the network 150. For example, one or more computing device systems 300 may perform one or more of the process steps described in FIG. 4A, FIG. 4B, and/or FIG. 5. Of course, computing device systems 300 may be configured to perform (or instruct other systems to perform) one or more other process steps described herein. A sample computing device system 300 is described in more detail with respect to FIG. 3.

The active reference ID repository 120 may be a database system owned or controlled by the managing entity and/or a third party that specializes in populating, maintaining, updating, and otherwise linking public keys of customers of the managing entity and/or merchants to reference identification codes associated with those public keys. In general, the active reference ID repository system 120 is configured to communicate information or instructions with the managing entity system 200, one or more computing device systems 300, and/or the third party system 130 across the network 150. For example, the managing entity system 200 may store linked reference identification codes for each of its customers in the active reference ID repository, along with public keys associated with each reference identification code (and therefore associated with each individual customer), within the active reference ID repository. The managing entity system 200 may continuously or periodically update the active reference ID repository over time, as certain permissions or time to live mechanisms associated with the reference identification codes, public keys and/or their paired private keys, or related encrypted digital envelopes expire (e.g., based on an exchange timestamp). As such, the active reference ID repository 120 may comprise a real-time or near real-time repository of information that enables a merchant system to match a received reference identification code of a customer with a public key of that customer. In some embodiments, the active reference ID repository 120 may actively push out a data feed with the reference identification code and public key information to one or more computing device systems 300 of merchant users 112 such that these computing device systems 300 receive an up-to-date cache of the information stored in the active reference ID repository 120. Additionally or alternatively, the computing device systems 300 of merchant users 112 may actively reach out to the active reference ID repository 120 to extract the information stored in the active reference ID repository (e.g., periodically and/or when that computing device system 300 of a merchant user 112 is "online" or otherwise connected to a wide area network 150 that enables the communication with the active reference ID repository 120). Of course, the active reference ID repository 120 may be configured to perform (or instruct other systems to perform) one or more other process steps described herein.

The third party system 130 may be any system that provides support, additional information, exchange processing, and the like to the rest of the system environment 100. For example, one embodiment of a third party system 130 comprises a financial institution system associated with the merchant user 112, whereby the computing device system 300 of the merchant user 112 communicates certain exchange information (which may include at least a portion of an exchange token) with the financial institution system, and the financial institution system processes this information and/or transmits at least a portion of that information to the managing entity system 200. Additionally or alternatively, a third party system 130 may comprise a system that provides encryption services, public and private key pairing information, reference identification code information, time to live mechanics information, exchange authorization information, and the like.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, an encryption application 250 which includes key pairing data 252 and reference ID data 254, an exchange application 260 which includes authorization data 262, and other computer-executable instructions or other data. The computer-executable program code of the network server application 240, the encryption application 250, and/or the exchange application 260 may instruct the processing device 220 to perform certain logic, data-processing, and data-storing functions of the managing entity system 200 described herein, as well as communication functions of the managing entity system 200.

In one embodiment, the encryption application 250 includes key pairing data 252 and reference data 254. The key pairing data 252 may comprise information that the managing entity system can utilize to generate private and public key pairs that can be used for asymmetric cryptographic key encryption schemes and/or digital signature schemes. The reference ID data 254 may include information that links an individual customer (e.g., the user 110) to a key pair, and especially to link said user to a public key that can be stored in a repository (e.g., the active reference ID repository 120) and/or transmitted to computing devices of other parties (e.g., the computing device system 300 of the merchant user 112) for use in decrypting transmitted information and/or verifying digital signatures on information.

In one embodiment, the exchange application 260 includes authorization data 262. This authorization data 262 may include factors regarding permissions for amount of resources that particular customers can utilize for offline exchange, including factors regarding the amount(s) of time that each customer is permitted to perform offline exchanges.

The network server application 240, the encryption application 250, and the exchange application 260 are configured to invoke or use the key pairing data 252, the reference ID data 254, the authorization data 262, and the like when communicating through the network communication interface 210 with the one or more computing device systems 300, the active reference ID repository 120, and/or the third party system(s) 130.

FIG. 3 provides a block diagram illustrating a sample computing device system 300 of FIG. 1 in more detail, in accordance with embodiments of the invention. In one embodiment of the invention, the computing device system 300 is a mobile telephone. However, it should be understood that a mobile telephone is merely illustrative of one type of computing device system 300 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 300 include a processor 310 communicably coupled to such devices as a memory 320, user output devices 336, user input devices 340, a network interface 360, a power source 315, a clock or other timer 350, a camera 380, and a positioning system device 375. The processor 310, and other processors described herein, generally include circuitry for implementing communication and/or logic functions of the computing device system 300. For example, the processor 310 may include a digital signal processor device, a microprocessor device, and various analog to digital converters, digital to analog converters, and/or other support circuits. Control and signal processing functions of the computing device system 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the computing device system 300 to transmit and receive web content, such as, for example, location-based content and/or other web page content, according to a Wireless Application Protocol (WAP), Hypertext Transfer Protocol (HTTP), and/or the like.

The processor 310 is configured to use the network interface 360 to communicate with one or more other devices on the network 150. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. The signals may include signaling information in accordance with the air interface standard of the applicable cellular system of a wireless network. In this regard, the computing device system 300 may be configured to operate with one or more air interface standards, communication protocols, modulation types, and access types. By way of illustration, the computing device system 300 may be configured to operate in accordance with any of a number of first, second, third, and/or fourth-generation communication protocols and/or the like. For example, the computing device system 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The computing device system 300 may also be configured to operate in accordance with non-cellular communication mechanisms, such as via a wireless local area network (WLAN) or other communication/data networks.

As described above, the computing device system 300 has a user interface that is, like other user interfaces described herein, made up of user output devices 336 and/or user input devices 340. The user output devices 336 include a display 330 (e.g., a liquid crystal display or the like) and a speaker 332 or other audio device, which are operatively coupled to the processor 310.

The user input devices 340, which allow the computing device system 300 to receive data from a user such as the user 110, may include any of a number of devices allowing the computing device system 300 to receive data from the user 110, such as a keypad, keyboard, touch-screen, touch-pad, microphone, mouse, joystick, other pointer device, button, soft key, and/or other input device(s). The user interface may also include a camera 380, such as a digital camera.

The computing device system 300 may also include a positioning system device 375 that is configured to be used by a positioning system to determine a location of the computing device system 300. For example, the positioning system device 375 may include a GPS transceiver. In some embodiments, the positioning system device 375 is at least partially made up of the antenna 376, transmitter 374, and receiver 372 described above. For example, in one embodiment, triangulation of cellular signals may be used to identify the approximate or exact geographical location of the computing device system 300. In other embodiments, the positioning system device 375 includes a proximity sensor or transmitter, such as an RFID tag, that can sense or be sensed by devices known to be located proximate a merchant or other location to determine that the computing device system 300 is located proximate these known devices. The positioning system device 375 may play a crucial role in transmitting location information associated with the computing device system 300 for determining when the computing device system 300 is in at or is in close proximity to a particular location, which may inform exchange authorization decisions that are made by the managing entity system 200 and/or a managing entity application 321 stored on the computing device system 300 of the user 110.

The computing device system 300 further includes a power source 315, such as a battery, for powering various circuits and other devices that are used to operate the computing device system 300. Embodiments of the computing device system 300 may also include a clock or other timer 350 configured to determine and, in some cases, communicate actual or relative time to the processor 310 or one or more other devices.

The computing device system 300 also includes a memory 320 operatively coupled to the processor 310. As used herein, memory includes any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/code executed by the processor 310 to implement the functions of the computing device system 300 and/or one or more of the process/method steps described herein. For example, the memory 320 may include such applications as a managing entity application 321, a conventional web browser application 322, a Short Message Service ("SMS") application 323, and/or a public key and identification code repository 324 (or any other application or database provided by the managing entity system 200, the active reference ID repository 120, and/or a third party system 130). These applications also typically instructions to a graphical user interface (GUI) on the display 330 that allows the user 110 to interact with the computing device system 300, the managing entity system 200, and/or other devices or systems. In one embodiment of the invention, when the user 110 decides to enroll in the managing entity application 321 program, the user 110 downloads, is assigned, or otherwise obtains the managing entity application 321 from the managing entity system 200, or from a distinct application server (e.g., from the active reference ID repository 120 or a third party system 130). In other embodiments of the invention, the user 110 interacts with the managing entity system 200 or the resource accumulation system 300 via the web browser application 322 in addition to, or instead of, the managing entity application 321. However, it should be known that portions of the invention described herein are performed in an "offline" environment, and therefore are not performed across a web browser application 322.

The memory 320 of the computing device system 300 may comprise a Short Message Service (SMS) application 323 configured to send, receive, and store data, information, communications, alerts, and the like via a wireless telephone network.

The memory 320 may also include the public key and identification code repository 324. In embodiments where the computing device system 300 is owned or managed by a user 110, this public key and identification code repository 324 may comprise a list of reference identification codes for a plurality of merchants, where each such reference identification code is linked with a public key for that same merchant. In this way, the user 110 (or the computing device system 300 itself) can input the reference identification code of a merchant that the user 110 is interacting with, and the identification code repository 324 will output the public key for that merchant, which can be used by the computing device system 300 to decrypt a message, exchange prompt, or other encrypted information received from a separate computing device system 300 that is associated with that merchant.

In embodiments where the computing device system 300 is owned or managed by a merchant user 112, the public key and identification code repository 324 may comprise a list of reference identification codes for a plurality of customers (including the user 110), where each such reference identification code is linked with a public key for that same customer. In this way, the merchant user 112 (or the computing device system 300 itself) can input the reference identification code of a customer that the merchant user 112 is interacting with, and the public key and the identification code repository 324 will output the public key for that customer, which can be used by the computing device system 300 to decrypt a message, exchange envelope, or other encrypted information received from a separate computing device system 300 that is associated with that customer.

The memory 320 can also store any of a number of pieces of information, and data, used by the computing device system 300 and the applications and devices that make up the computing device system 300 or are in communication with the computing device system 300 to implement the functions of the computing device system 300 and/or the other systems described herein. For example, the memory 320 may include such data as exchange permissions or authentication requirements established by the managing entity system 200 and/or the owner of the computing device system (e.g., the user 110 or the merchant user 112), and the like.

Referring now to FIG. 4, a flowchart is provided to illustrate one embodiment of a preliminary process 400 for resource distribution within an offline environment, in accordance with embodiments of the invention. An initial step for this process 400 is that the managing entity system generates managing entity public/private key certificates (i.e., key pairs) for facilitating signing or encryption elements based on a trusted certificate root chain (e.g., obtained from a third party publicly trusted entity).

The managing entity system may then populate a repository with a current list of the generated managing entity public keys and associated reference identification codes for a plurality of customers (including the user associated with the mobile device of the user), as shown in block 404. Each reference identification code may comprise a set of alphabetical and/or numeric characters that is unique to a particular customer. The repository may comprise a relational database that is structured to recognize relations (i.e., links) between specific reference identification codes and their associated managing entity public keys. In some embodiments, a single user may be associated with multiple reference identification codes (as well as the associated managing entity public keys). Alternatively, a single managing entity key pair may be associated with multiple customers. In such embodiments, the size of the offline data cache on the computing device of the merchant is reduced as compared to the one-to-one embodiment, because a single managing entity public key is associated with multiple reference identification codes (instead of multiple individual keys each paired with a reference identification code). Each of the reference identification codes and linked managing entity public keys of customers may be generated at some point in time and then later assigned to a particular customer (e.g., by transmitting a managing entity private key that is part of a managing entity key pair with the particular managing entity public key to the particular customer).

Additionally or alternatively, the managing entity system may generate a managing entity key pair (i.e., a managing entity private key and its paired managing entity public key) in response to a particular customer requesting an amount of resources for offline exchange. In such embodiments, the managing entity system may assign a reference identification code for that particular customer, link the reference identification code with the managing entity public key, and subsequently store the linked reference identification code and managing entity public key in the repository.

In some embodiments, the managing entity system may cause the repository to automatically transmit a data feed of the currently-stored information to one or more computing devices (e.g., a computing devices of merchants). Additionally or alternatively, the repository may be configured to permit authorized computing device systems (e.g., a computing device system of a verified merchant) to access the repository and extract at least a portion of the information stored in the repository.

The use of a repository that makes available the links between the reference identification codes and the associated managing entity public keys is an important aspect of permitting two computing devices to execute a digital exchange of resources in an offline environment, because it provides a set of information that will be stored locally within one or more of the computing devices performing the offline exchange of resources to enable such offline exchange of resources.

The managing entity system may manage this repository of managing entity public keys and associated reference identification codes over time, based on certain time to live mechanisms of the reference identification codes or the managing entity public keys, certain permissions or authorization requirements of the customers, and the like. As such, the managing entity system is able to rescind any authorizations or permissions for the repository over time, maintaining an accurate and up-to-date record of which reference identification codes and associated managing entity public keys are active at any given time.

In some embodiments, the repository of managing entity public keys and associated reference identification codes is subdivided based on current or recent (e.g., within a predetermined period of time) geographic locations of associated computing devices) and/or types of exchanges that are authorized by the offline exchange of resources system.

Anyone accessing the repository will be able to employ or otherwise input a reference identification code (e.g., a code received from a customer), and the repository will return, display, or otherwise output the linked managing entity public key for that reference identification code.

In some embodiments, the repository may contain additional information like information about an identity of a customer associated with a particular reference identification code, information about an account of the customer associated with the particular reference identification code, information about a financial institution associated with the customer associated with the particular reference identification code, time to live mechanisms for the reference identification codes and/or managing entity public keys, geographical information associate with the reference identification codes and/or managing entity public keys, and the like.

While this repository of block 404 is described with respect to customers (including the user), it should be known that in some embodiments, an additional repository may be generated and populated by the managing entity system (or another associated entity system) that includes a list of public keys and associated reference identification codes for a plurality of merchants. This additional repository is configured to function in a similar manner to the repository for customers, except that the additional repository is configured to communicate to computing devices of the customers (including the mobile device of the user) to provide the merchant reference identification codes and their associated public keys.

In some embodiments, the managing entity system may additionally generate customer private/public key pairs, including a user resource public key and its associated resource private key. In embodiments where the managing entity system has generated a user resource public key and its paired user private key, the managing entity system may maintain the user resource private key and associate that user resource private key with all (or some) reference identification codes (as described herein) associated with the user. In such embodiments, the computing device of the merchant (and any other third party) would not have access to the user resource private key or the user resource public key, but the managing entity system would have access to the user resource private key (and may transmit or otherwise issue the user resource public key to the mobile device of the user).

As shown at block 406, the computing device of the merchant may store (e.g., cache), internally for offline access, a current list of managing entity public keys acquired from the managing entity system that are each associated with a plurality of customers (including the user), where each managing entity public key is linked with its associated reference identification code of one of the plurality of customers. The list of managing entity public keys may be a subset (or the entire set) of the managing entity public keys referenced in block 404. Likewise, the associated reference identification codes for the plurality of customers may be a subset (or the entire set) of the reference identification codes referenced in block 404. This step shown at block 406 is important for a subsequent offline exchange because it allows the merchant system to be offline (i.e., no communication with the managing entity or some other external system) and still have a collection of the currently active reference identification codes of users and their associated managing entity public keys.

The merchant entity is storing the information from the repository in a local store on its computing device (e.g., a point of sale device, an automated teller machine, a mobile computing device, a computing device, and the like), so that the merchant entity can access the repository information (in its relational format) when a customer (e.g., the user) issues or otherwise transmits a reference identification code and an encrypted envelope which comprises an exchange token. In such embodiments, the computing device of the merchant will be able to validate the reference identification code and encrypted envelope even though the computing device of the merchant does not have a connection to the cloud or any wide area network. As will be described in more detail below, this block 406 allows the merchant to use the local store to look up the customer's particular managing entity public key based on a received reference identification code of that customer, and the computing device system can use that managing entity public key to validate at least a portion of the exchange token and/or decrypt a digital envelope that has been encrypted by the paired managing entity private key of this particular managing entity public key.

As the computing device of the merchant is not continuously online, and because the information stored in the repository changes over time, the computing device of the merchant may be configured to periodically (e.g., every few hours, once a day, once a week, or the like) connect to a wide area network (e.g., the Internet) to access the repository of the managing entity system to receive and store an up-to-date account of the repository. Additionally or alternatively, the computing device of the merchant may be configured to continuously access the repository of the managing entity system whenever the computing device of the merchant does access a wide area network, such that the computing device of the merchant can have the most up-to-date records of the active reference identification codes and their associated managing entity public keys for the plurality of customers (including the user).

Because the repository could comprise a large amount of data and information, the repository information being acquired by the computing device of the merchant may be delivered to the merchant in a compressed format.

To initiate the user's involvement in this process 400, the mobile device of the user may execute block 408 by requesting, from the managing entity system, an amount of resources to be used in offline exchanges. This is the first step to enable the computing device of the user to emit a digital exchange token (e.g., an encrypted digital envelope) as part of an exchange with the merchant while the mobile device of the user and the computing device of the merchant are offline. This request generally is made while the mobile device of the user is online (e.g., connected to a wide area network like the Internet or a mobile telecommunications network), such that the user is able to log into an account (i.e., authenticate or validate the user) with the managing entity system to request the association of a certain amount of resources with the mobile device of the user for later use as part of one or more exchanges of resources in an offline environment.

While block 408 is described as being performed by the mobile device of the user, it is also possible that a separate computing device of the user performs this requesting step. For example, the user may utilize a desktop computer of the user, an automated teller machine of the managing entity system that the user has access to, or the like to request the amount of resources to be used (or available to be used) in offline exchanges to be associated with the mobile device of the user.

Alternatively, the mobile device of the user may communicate with a computing device of a third party (or of the managing entity system, or a separate computing device of the user) to cause that other computing device to act as an intermediary by receiving a prompt from the mobile device of the user, relaying that prompt as the request to the managing entity system, and relaying subsequent information received from the managing entity to the mobile device of the user (including any authorizations, managing entity private keys, user resource public keys, reference identification codes, and time to live mechanism information, as described herein). For example, the mobile device of the user may use a near field communication channel like Bluetooth or RFID to search for nearby computing devices that are equipped with a managing entity application. In such embodiments, one device could be a mobile phone while the other is a coin-equivalent (e.g., regular RFID enabled device that the managing entity has provided). The coin-equivalent device may be the mobile device of the user, and it can be associated with a certain amount of resources, which is updated when it is brought near to a mobile phone of the user that communicates as an intermediary between the managing entity system and the coin-equivalent device to update the amount of resources, managing entity private key information, user resource public key information, reference identification code information, time to live mechanisms, and the like to be associated with the coin-equivalent device.

Similarly, the mobile device of the user may be Bluetooth enabled and configured to search for nearby mobile devices of third parties (e.g., a mobile phone of a nearby individual that has agreed to participate in such a communication) that have a managing entity application stored on it. The mobile device of the user can use the Bluetooth communication channel to announce itself to those other devices and transmit a request for an update to the mobile device of the user for the offline exchange of resources. Once such a third party device with managing entity application is identified and the communication is established, the third party device may utilize a wide area network to access a cloud or other application of the managing entity to transmit the request for an update to the amount of resources available for offline exchange. This request will identify the mobile device of the user, can include GPS coordinates of the mobile device of the user, and information regarding the request to update the amount of resources available for offline exchange. The request can also include a request to permit the device of the third party to distribute the necessary information to enable the mobile device of the user to perform an authenticated offline exchange (as described in more detail below). This third party device enabled process is similar to the cloud authorization, distributed authorization, and/or local network operation authorizations used for automated teller machine supporting and updating network. In some embodiments, the third party device can also relay information about previous offline exchanges performed by the mobile device of the user.

In some embodiments, the mobile device of the user is a mobile phone, wearable device (e.g., a smart watch), a tablet computer, or the like, whereby the mobile device may at some points in time have access to (or be configured to have access to) a wide area network that enables communication with the managing entity system. For example, a smart watch may be Wi-Fi enabled, such that it has access to a wide area network when the smart watch is at a home of the user, but the smart watch may be configured to not access a cellular network or any other wide area network when the smart watch is not connected to Wi-Fi.

Alternatively, in some embodiments, the mobile device of the user can be any device that is enabled with near field communication capabilities (e.g., Bluetooth and an RFID transmitter, or the like), and can be embodied in a necklace, security badge, plastic card, ring, wristband, phone case, clothing or accessory, or the like. In such embodiments, the alternative block 408 which utilizes a third party device to act as an intermediary between the near field communicating mobile device of the user and the managing entity system is especially useful.

The managing entity system may process the request from the mobile device of the user by transmitting, for storage on a managing entity application stored in the mobile device of the user, at least (1) an authorization for the mobile device of the user to exchange up to the amount of resources for offline exchange, (2) a globally unique identifier (GUID) assigned to the user that is unique among the managing entity's customer population, (3) a managing entity private key assigned to the user, (4) a reference identification code mapped to both (i) a managing entity public key assigned to the user and (ii) the corresponding paired managing entity private key, (5) a user resource public key, (6) an exchange token structure aligned with the reference identification code version, and (7) a time to live mechanism for exchanges, as shown at block 410.

As noted above, the managing entity system, upon receiving the request form the mobile device of the user, determines whether (and to what extent) the user is authorized to perform exchanges of resources in an offline environment. For example, the managing entity system may establish controls around a total amount of resources that the user is authorized to exchange in an offline environment, amounts of resources that the user is authorized to exchange in a single exchange in an offline environment, a geographic region in which the user is authorized to perform exchanges of resources in an offline environment, types of merchants (and/or products or services) that the user is authorized to exchange resources for in an offline environment, specific merchants (and/or products or services) that the user is authorized to exchange resources for in an offline environment, and the like. This information can be aggregated by the managing entity system and transmitted along with the other information referenced in block 410 to the mobile device of the user (specifically to a secure managing entity application that is stored on the mobile device of the user). The managing entity is able to maintain control over the authentications because these authentications are stored within, and run on, the managing entity's application on the mobile device of the user.

The managing entity private key assigned to the user that is transmitted under block 410 is the paired private key of the managing entity public key assigned to the user that is stored in the repository generated and populated by the managing entity system. This managing entity private key assigned to the user is an encryption key selected by the managing entity system (e.g., randomly) along with its managing entity public key counterpart and is associated by the managing entity system with the mobile device of the user. In embodiments where the managing entity generates or establishes new managing entity public and private key pairs for each customer request, the managing entity system may automatically populate the repository with this newly associated managing entity public key (and the associated reference identification code, as noted below) in real time.

In some embodiments, the system may transmit multiple managing entity private keys to be deployable from the mobile device of the user. In such embodiments, the system may also transmit multiple authorizations, time to live mechanisms, and reference identification codes (which will also be added to the repository along with the paired managing entity public keys for each of the multiple managing entity private keys transmitted to the mobile device of the user). In such embodiments, the computing device of the user may be permitted to enter into multiple exchanges while in an offline environment, where each exchange can utilize (but is not required to utilize) a different managing entity private key and is encrypted with its associated managing entity private key (while also being associated with the relevant reference identification code that will point a computing device of a merchant to the necessary paired managing entity public key for decryption purposes, as is described in more detail below).

The transmission of the managing entity private key to the mobile device of the user may include instructions that tell the mobile device of the user to use this private key as the signature (i.e., encryption) on the outside of a digital envelope that is used in offline exchanges. This way, the mobile device of the user is configured to encrypt a digital envelope used in an offline exchange with the appropriate managing entity private key and associate that encrypted digital envelope with the appropriate reference identification code (as noted below) to allow the computing device of the merchant to identify the appropriate managing entity public key assigned to the user for decryption of the encrypted envelope.

The managing entity system may generate all private and public key pairs used in this process 400 such that the managing entity is the authority behind each key chain that each party to the process looks up to validate that the key is issued by the managing entity system. In this way, the managing entity system controls which private keys (with public keys stored in the repositories of block 404 and/or block 406) are distributed to which of its customers (including the user)).

As discussed above, the reference identification code associated with the managing entity public key assigned to the user is transmitted to the computing device of the user (specifically to the managing entity application stored on the computing device of the user). This reference identification code is stored along with the managing entity private key (i.e., the managing entity private key that is paired with the managing entity public key that is associated with the reference identification code of the user within the repository) within the mobile device of the user such that the managing entity application on the mobile device of the user will attach to (or otherwise send the reference identification code along with) the digital envelope that is encrypted by that managing entity private key. As such, any entity that receives the encrypted digital envelope (i.e., encrypted by the managing entity private key) and the associated reference identification code will be able to match the reference identification code within the repository to identify the paired managing entity public key that can be used to decrypt that digital envelope.

In some embodiments, the managing entity system may additionally or alternatively transmit a link that can replace the use of a managing entity private key in embodiments where the computing device of the merchant is not offline, whereby the link directs the computing device of the merchant to an online repository to retrieve the corresponding managing entity public key of the user.

The reference identification code associated with the user comprises a reference to certain account and identification information for the user in the form of a surrogate code that does not disclose any of that account and identification information on its face. For example, each reference identification code may comprise an alphabetical, alphanumerical, numerical or other set of characters that are issued by the managing entity system such that the managing entity system is able to identify the protected account and identification information when the exchange token (or at least a portion thereof) is presented for exchange at a later point in time. Similarly, third parties may be able to identify the identity of the managing entity as the issuer of the reference identification code (and therefore the issuer of the associated managing entity key pair) based on information included in the reference identification code (e.g., a first set of characters identifies the managing entity as the issuing authority or entity).

The time to live mechanism for exchanges may comprise a counter or timestamp attached to or embedded in the data of the reference identification code, the managing entity private key assigned to the user, the user resource public key, or the like, in a manner that informs any viewer or processor of that information whether a predetermined authorized period of time for exchanges has been met or otherwise satisfied. As long as the reference identification code, the managing entity private key, and/or the user resource public key is utilized or processed within the time period set by the time to live mechanism, the mobile device of the user is able to execute the exchange with the computing device of the merchant in the offline environment and the computing device of the merchant is able to present the exchange information to the managing entity system (either directly or indirectly through a third party entity such as a financial institution of the merchant). Examples of the period of time established by the time to live mechanism of the managing entity private key assigned to the user comprise several hours, one day, a few days, one week, one month, and the like. In some embodiments, the managing entity system may establish or otherwise set the period of time of the time to live mechanism for the managing entity private key assigned to the user based on an amount of resources that are made available for exchange, based on the authorized exchange types, based on the authorized merchant types, based on authorized geographical regions for an offline exchange, and the like. It is possible to allow variations to the time to live or number of negotiations among participating merchants or suppliers for the managing entity private key assigned to the user.

While this process 400 describes a time to live mechanism for the managing entity private key assigned to the user, it should be known that, additionally or alternatively, one or more time to live mechanisms may also be established for the private key(s), the public key(s), the encrypted envelope (s) (as described more fully below), and the reference identification code(s).

The time to live mechanics described herein can be managed and even altered by the managing entity system over time. For example, the managing entity system may set a time to live mechanism for the managing entity private key assigned to the user of one day, but this period of time associated with the time to live mechanism may change upon an updated request or connection from the mobile device of the user. The user may cause the mobile device of the user to request the amount of resources for offline exchange (i.e., block 406) multiple times before such an exchange actually occurs, and the managing entity system can re-authorize or adjust the authorization and time to live mechanisms associated with the mobile device of the user. For example, if the mobile device of the user is in the same geographic location and the request for an amount of resources for offline exchange has not changed, the managing entity system may keep a one-day time to live mechanism (i.e., one day from the updated transmission, not from the original transmission). However, if the request by the mobile device of the user is sent from a geographic location that is associated with longer time to live mechanisms, as established by the managing entity system, then the managing entity system may adjust the time to live mechanism to permit a longer period of time for an offline exchange to occur before the user is required to connect with the managing entity system again to update the managing entity private key assigned to the user and its time to live mechanism. Similarly, if an updated request for an amount of resources for offline exchange includes a reduction in the amount of resources requested, then the managing entity system may determine that the reduced amount of resources allows for a longer time to live mechanism for the managing entity private key assigned to the user. Again, all references to the time to live mechanism for the managing entity private key assigned to the user can also or alternatively apply to the other components of this application (e.g., reference identification code, other private keys, public keys, and the like).

In some embodiments, the time to live mechanism is monitored locally by the managing entity application stored on the mobile device of the user. For example, the time to live mechanism may be longer when the mobile device of the user is within a predetermined geographic region, as opposed to outside that region, so the managing entity application may monitor GPS coordinates of the mobile device of the user to determine what the time to live mechanism is at any given moment (even when the mobile device of the user is not connected to a wide area network), and can transmit the time to live mechanism information along with other exchange information when prompted.

The user resource public key of the user is a public key generated as part of a key pair by the managing entity (or a trusted third party authority), and is associated with the resource account of the user that will be the account from which the exchange amount will be transferred out of when the managing entity ultimately transfers the exchange amount to an account of the merchant. The managing entity system will maintain the paired user resource private key in an internal database (or an external database that the managing entity system has access to) and will pair this key pair with the GUID that is sent to the mobile device of the user. As such, when the managing entity system later receives (or identifies) the GUID from the computing merchant system, the managing entity system can employ this GUID to its maintained database to identify the paired user resource private key that can be used to decrypt at least a portion of the exchange token and/or to validate a digital signature of at least a portion of the exchange token. While these processes 400 and 500 describe the transmittal of the user resource public key to the mobile device of the user, it is also possible to switch the user resource public key and the user resource private key throughout the process to accomplish the same results.

The GUID may be a globally or universally unique identifying code that is issued by the managing entity system for an individual customer of the managing entity system. In some embodiments, each GUID may represent a single account (e.g., a resource account) for a single customer or entity. The managing entity system may keep a record of this GUID in an internal database such that when the managing entity receives the GUID as part of an exchange, the managing entity can determine identifying information about the customer (e.g., the user resource private key) and the account information to use for that customer. However, because the GUID does not have any personally identifiable or account information embedded its code, any other entity that receives or otherwise accesses the GUID would not be able to identify the customer or the customer's account.

In some embodiments, the managing entity application of the mobile device of the user may be configured to automatically attempt to access a wide area network to connect with the managing entity system to update the request for the amount of resources for offline exchange and/or to update any time to live mechanisms associated with the mobile device of the user.

In some embodiments of this process 400, the mobile device of the user will need to decrypt certain information received from the computing device of the merchant. In such embodiments, the managing entity system may additionally transmit to the computing device of the user (or the user may actively access and store) public keys associated with a plurality of merchants (including the merchant described herein) along with reference identification codes linked with each of the public keys. As such, if the computing device of the user receives information (e.g., an exchange prompt) with at least a portion of that information encrypted by a private key of the merchant, then the computing device of the user can match a received reference identification code of the merchant to its associated public key by analyzing the internal database of merchant reference identification codes and linked public keys.

Once the mobile device of the user receives the information from the managing entity system, the mobile device of the user executes block 412 (automatically upon receiving the information, and at least periodically or every time the user requests the execution of an exchange), where the mobile device of the user monitors the code signature of the managing entity application, and rejects any requested exchanges if an alteration to the code signature of the managing entity application is detected. In general, the managing entity application stored on the mobile device of the user will analyze the code signature of at least a portion of the managing entity application in response to receiving the transmission from the managing entity system to ensure that the managing entity application on the mobile device of the user remains secure. This analysis may be completed while in an online environment such that the system can confirm that the most up-to-date application code is currently installed on the mobile device of the user. However, the managing entity system application can then perform similar analysis of the application code signature even while in the offline environment to ensure that the managing entity application code has not been altered at any point. If the managing entity application code has been altered, then the system will prohibit any offline exchanges through the mobile device of the user until the managing entity application has been restored to the then-current version and verified by the managing entity system as being secure. In some embodiments, such a detection will cause the managing entity application to fail to launch.

These "signing" exercises can occur automatically, periodically, and/or in response to the mobile device of the user receiving an exchange prompt from the merchant application. By ensuring the code of the managing entity application has not been modified or altered, the system protects the user and the merchant from any malfeasance. This is another important aspect for maintaining a secure environment locally to the mobile device of the user that effectively makes the user's mobile device a mobile automated teller machine for offline exchange, complete with specific authorization requirements, encryption features, and other security features. For example, if the managing entity system authorizes a first amount of resources to be exchanged in an offline environment, the managing entity application stored on the mobile device of the user receives this information and tracks, locally to the device, the amounts of resources that are exchanged in the offline environment without permitting exchanges that would exceed the authorized amount. Because the managing entity application shuts down if its code has been altered, the managing entity application is not subject to alterations or modifications in the code which would otherwise bypass the authorized exchange amounts.

At this point in the process 400, both the user and the merchant are able to utilize their respective devices to exchange resources while in an offline environment (i.e., not on a wide area network like the Internet where wither device as a connection to the managing entity system). The devices may be in an offline environment due to the geographic location of the exchange, due to preferences of the user and/or the merchant, due to security requirements of the user and/or the merchant, or for the purpose of reducing the processing power used by both devices when they are connected to a wide area network such as the Internet and/or a mobile telecommunications network (e.g., to cache one or more offline exchanges and transmit information about those exchanges to the managing entity system or a third party system only at certain intervals or as prompted by the user or the merchant).

The user and the merchant may come to an agreement on the exchange of a certain amount of resources (i.e., an amount of resources that is less than or equal to the amount of resources that the managing entity system has made available to the computing device of the user for offline exchange). The merchant can then cause the computing device of the merchant (e.g., a point of sale device, a computer, a workstation, a mobile phone, a tablet computer, a wearable computing device, or the like) to generate an exchange prompt (e.g., a bill of sale) for the item(s) (e.g., goods and/or services) being exchanged for resources from the user, whereby the bill of sale includes a request for the certain amount of resources agreed to by the user.

Turning now to FIG. 5A and FIG. 5B, a flowchart is provided to illustrate one embodiment of a process 500 for resource distribution within an offline environment, in accordance with embodiments of the invention. This process 500 is an extension of the process 400 described in FIG. 4, and is made possible through the preparation steps described therein.

Once the merchant and the user have established a desired or proposed exchange or transaction, the computing device of the merchant executes block 502, by transmitting an exchange prompt to the computing device of the user comprising an exchange amount, details about the exchange, and the like (e.g., an encryption of at least a portion of the exchange prompt using a public key of the merchant), via a near field communication channel, where at least a portion of the exchange prompt is encrypted (or digitally signed) using a merchant private key. As noted above, the exchange prompt may comprise a bill of sale or other request for an exchange of resources, whereby the mobile device of the user is providing the resources to the computing device of the merchant. The details about the exchange may include, but are not limited to, a purchase price for goods and/or services being provided by the merchant, per item pricing, extended item details (e.g., manufacturer, manufacture date, stock keeping unit, serial number, expiration date, and the like, as pulled from a merchant inventory stored in (or otherwise accessible to) the computing device of the merchant), sales tax information, the merchant's resource transmittal mechanism (e.g., an automated clearing house routing number and account number, identity of corresponding financial institution supporting the requisite application program interface for exchange tokens, and/or the like).

As noted above, in some embodiments, at least a portion of the exchange prompt may be encrypted by a private key associated with the merchant (e.g., as established by the managing entity system and/or a third party entity like a financial institution associated with the merchant), whereby that private key associated with the merchant is paired with a public key that can be used to decrypt the encrypted portion of the exchange prompt, and whereby the paired public key is stored in a repository (similar to, or comprising, the repository described in block 404) in a manner that links that paired public key with a reference identification code of the merchant. In such embodiments, the mobile device of the user may periodically access the repository of merchant public keys and linked reference identification codes and store at least a portion of those keys and linked codes (e.g., all merchant public keys and reference identification codes for merchants within a geographic region of the mobile device of the user at the time, or all merchants on a predetermined list of merchants, as established by the user) internally within the device.

In some embodiments, the merchant may transmit a public key of the merchant to the mobile device of the user along with the exchange prompt, along with instructions to cause the mobile device of the user to encrypt the exchange prompt (or information extracted from the exchange prompt) with the public key of the merchant. The merchant and/or the managing entity (or a third party entity like a financial institution associated with the merchant that assigned the key pairing to the merchant) are the only entities that will be able to decrypt the exchange prompt to identify certain details of the exchange prompt after the user encrypts the information as a component of an encrypted digital envelope.

Of course, if the entire exchange prompt (or at least a portion of the exchange prompt that requires review or analysis by the mobile device of the user) is enclosed in the private key signature encryption, then the paired public key of the merchant would be required to be available on the mobile device of the user in order for the mobile device of the user to decrypt it and determine the amount that the coin must represent in payment. It may be impractical to keep the public keys of all merchants in the world stored on a mobile device of a user, and that is why only some reference identification codes and associated public keys for merchants (e.g., for those merchants that are geographically near or frequently accessed by the user) are stored locally. However, it is also possible that the exchange prompt merely includes the merchant's public key as one item of the exchange prompt's collection of items which is not encrypted/signed by the merchant's private key. This alternative would be invoked when the mobile device of the user does not possess the necessary public key of the merchant and may involve a negotiation between the mobile device of the user and the computing device of the merchant to achieve the best offline exchange method available. Under this alternative, if the merchant's provided key is not matched by any of the public keys currently available on the mobile device of the user, that does not automatically prevent for the mobile device of the user from executing any offline exchanges. Instead, the mobile device of the user may transmit a notification to the computing device of the merchant requesting this alternate version of the exchange prompt whereby the public key of the merchant is provided directly to the mobile device of the user from the computing device of the merchant. In some embodiments, the fact as to whether the mobile device of the user has the public key of the merchant stored locally on its own device, as opposed to receiving the public key of the merchant directly from the computing device of the merchant may have bearing as to the amount of resources that are available for exchange with the exchange token. In some embodiments, the merchant entity digitally signs the exchange prompt, and does not fully encrypt the exchange prompt.

In some embodiments, instead of encrypting at least a portion of the exchange prompt, the computing device of the merchant may digitally sign the exchange prompt with the private key of the merchant, thereby permitting anyone holding the paired public key of the merchant (e.g., the mobile device of the user, the computing device of the merchant, a financial institution associated with the merchant, and/or the managing entity system) to verify that the portion of the exchange prompt digitally signed by the private key of the merchant has not been altered since digitally signed, and that the merchant is the source of the information. This digital signature is especially helpful when one or more entities wish to confirm the accuracy of the exchange prompt from the merchant.

The mobile device of the user receives, via the near field communication channel from the computing device of the merchant, the exchange prompt, as shown at block 504. As noted above, the mobile device of the user may perform one or more checks on the information received from the computing device of the merchant, including the exchange prompt and, if applicable, a determination is made as to whether the mobile device of the user has an internally-stored record of the reference identification code of the merchant and its linked public key for decryption purposes.

In embodiments where the computing device of the merchant has encrypted at least a portion of the exchange prompt that the mobile device of the user needs access to (e.g., for verification purposes, for internal records, and/or for authentication purposes), the mobile device of the user may then decrypt the encrypted portion of the exchange prompt using the identified public key of the merchant.

The mobile device of the user (specifically the managing entity application stored on the mobile device of the user) may perform one or more checks on the information contained in the exchange prompt to ensure that the exchange amount is within the amount of resources for which the mobile device of the user is authorized to exchange in the offline environment.

Once the user has confirmed their desire to execute the exchange, the process 500 may proceed to block 506, where the mobile device of the user generates a first encrypted envelope, encrypted by the user resource public key, with contents comprising at least (1) an exchange amount (i.e., from the remaining available user resources for offline exchange), (2) and exchange timestamp, (3) a time to live expiration arising out of the exchange timestamp (based on the time to live mechanism), and (4) information from the exchange prompt including any encrypted portion of the exchange prompt. In embodiments where the mobile device of the user has received multiple managing entity private keys associated with the user for offline exchange (and/or user resource public keys), the managing entity application stored on the mobile device of the user may be configured to determine, based on instructions previously provided by the managing entity system, which managing entity private key assigned to the user should be utilized for this transaction (e.g., based on time to live mechanisms for the managing entity private keys, the user resource public keys, and/or the reference identification codes).

The system may designate or adjust the amount to be assigned to the exchange amount at this point in time, once the initial exchange amount has been requested from the computing device of the merchant. In some embodiments, the managing entity application may cause a display of the mobile device of the user to present a request for the amount to be associated with the exchange token. For example, the user may be prompted to confirm an exchange amount, add any additional resource amounts, add or confirm any tip or tax amounts, and the like. In such embodiments, the system may receive a user input, via the user interface of the mobile device of the user, comprising the amount to be associated with the proposed exchange and may designate the exchange amount with this amount of resources so long as the adjusted exchange amount is less than or equal to the amount of user resources to be used in offline exchanges.

The managing entity application may further determine the exchange timestamp (i.e., the time that the exchange is confirmed and/or authorized by the user, via the mobile device of the user) and store this within the first digital envelope along with the other exchange information. Furthermore, the managing entity application may store the exchange prompt itself or components or other information extracted from the exchange prompt into the first digital envelope such that a complete record of the exchange request and the exchange information remain together.

The managing entity application can then use the user resource public key to encrypt the first digital envelope using an asymmetric key encryption scheme, such that the paired user resource private key (e.g., as held by the managing entity system) is able to decrypt the first encrypted digital envelope. However, entities that do not have access to the paired user resource private key are not able to decrypt this encrypted first digital envelope, which allows the information to remain secure and unaltered unless and until received by an entity with the appropriate paired user resource private key (e.g., the managing entity system).

The process 500 may then proceed to block 508, where the managing entity application of the mobile device of the user generates a second encrypted envelope (the "exchange token") using the exchange token structure, encrypted by the managing entity application's assigned private key assigned to the user, where the contents of the second digital envelope include at least (1) the first encrypted envelope, (2) the exchange amount, (3) the exchange timestamp, (4) the time to live expiration arising out of the exchange timestamp, and (5) a hashed value of the first encrypted envelope's contents and the GUID generated with a hashing mechanism (e.g., an algorithm) known only to the managing entity system. The hashed value may be automatically generated or otherwise determined by the managing entity application of the mobile device of the user.

The managing entity application can then use the managing entity private key assigned to the user to encrypt this second digital envelope using an asymmetric key encryption scheme, such that the paired managing entity public key assigned to the user is able to decrypt the second encrypted digital envelope. Of course, the managing entity application may link or otherwise attach the reference identification code for the user that is associated with the appropriate managing entity public key assigned to the user that is paired with the managing entity private key used to encrypt the second digital envelope such that the reference identification code is not encrypted but instead is accessible by the computing device of the merchant (and subsequent devices and systems, if needed). Once the second digital envelope has been encrypted and associated with the reference identification code, anyone accessing the second digital envelope and reference identification code will only be able to see the reference identification code, meaning any sensitive information stored in the second digital envelope is secure. However, any entity that has access to the repository of managing entity public keys and associated reference identification codes for the customers of the managing entity system (e.g., the managing entity system itself, the computing device of the merchant, a third party like a financial institution associated with the merchant that has received access to the repository from the managing entity system, and the like) is able to match the reference identification code of the user to the appropriate managing entity public key assigned to the user that is paired with the managing entity private key assigned to the user that has been used to encrypt the second digital envelope. Therefore, any such entity that has identified the paired managing entity public key assigned to the user would be able to decrypt the second encrypted envelope.

In some embodiments, the second digital envelope may further include a universally unique identifier associated with the mobile device of the user as an additional layer of security and detail for authorization and/or record keeping purposes. In such embodiments, the managing entity system, once it receives the presentment of the second digital envelope, may confirm that the managing entity private key assigned to the user and the user resource public key were previously sent to that specific mobile device of the user, based on the universal unique identifier.

While the second digital envelope has been described as including and encrypting most information associated with the proposed exchange except for the reference identification code associated with the user, it should be known that one or more additional items may not be encrypted during this process at block 508 (or at all during the process 500). For example, in some embodiments, information about the financial institution that issued the managing entity public and private keys (i.e., the managing entity system in this embodiment), the exchange amount, the exchange timestamp, timing information for the exchange prompt, a merchant identifier, and the like, may remain unencrypted while the other more sensitive information required to enable the exchange for settlement is encrypted and therefore hidden based on the asymmetric key encryption scheme. Of course, this concept carries through the entire process 500, so where the first and second encrypted digital envelopes and the reference identification code are described, it should be known that other information may be transmitted in an encrypted, digitally signed (e.g., by the private key of the user, by the managing entity private key of the user, by the merchant private key), or unencrypted manner.

Once the exchange token has been encrypted, only the merchant identified by the digital envelope (either the encrypted digital envelope or the unencrypted information that is associated with the encrypted digital envelope) can successfully present the exchange token (or a portion thereof) for settlement (either directly or indirectly via a financial institution associated with the merchant, on the merchant's behalf).

The exchange token (and/or the first digital envelope) is the digital equivalent of an endorsed cashier's check from a financial institution which guarantees payment to the merchant bearer upon presentment to the issuing financial institution (i.e., the managing entity system in this embodiment). What makes that a value equivalent to an endorsed cashier's check is that once it has been passed from the remitter to the bearer, the bearer has something that is redeemable for the amount of resources (e.g., cash) that are ultimately designated for the exchange token. In effect the mobile device of the user becomes a universally available personal automated teller machine dispensing digital resources (e.g., currency) up to the authorized amount (e.g., total amount, per-exchange amount, and/or per predetermined time period amount).

The mobile device of the user may proceed to block 510 by transmitting the reference identification code, an identity of the managing entity (e.g., as embedded within the reference identification code), the GUID, and the exchange token (i.e., the second encrypted envelope) to the computing device of the merchant via a near field communication channel. Importantly, the mobile device of the user and the computing device of the merchant can remain "offline" in this scenario, as they are only communicating via the near field communication channel and are not using wide area network connections to access a cloud application or other online service of the managing entity system or any other entity that is configured to assist or process the proposed exchange. The second encrypted digital envelope and the reference identification code (and any other unencrypted information that is associated with the second encrypted digital envelope) can be transmitted securely from the mobile device of the user to the computing device of the merchant using Bluetooth, RFID, NFC, or a similar wireless proximity technology. In some embodiments, the mobile device of the user and the computing device of the merchant may communicate their sensitive information (e.g., the exchange prompt and/or the second encrypted digital envelope) and associated information via a wired connection between the two devices.

Once the mobile device of the user transmits the reference identification code and the encrypted digital envelope, the managing entity application on the mobile device of the user may record the offline exchange with the merchant and queue this offline exchange record to be posted to the managing entity system once the mobile device of the user is back online. In some embodiments, the mobile device of the user can transmit this posting of the offline exchange along with a request to replenish a total amount of resources that can be exchanged by the mobile device of the user in an offline environment.

The computing device of the merchant, at block 512, receives the transmitted reference identification code, the identity of the managing entity, the GUID, and the exchange token (i.e., the second encrypted envelope) from the computing device of the user. In some embodiments, the mobile device of the user has additionally transmitted at least a portion of the exchange prompt in an unencrypted manner, where this portion of the exchange prompt was digitally signed by the private key of the merchant. In such embodiments, the computing device of the merchant may verify that the exchange prompt information remains accurate and consistent with its status when originally signed by the merchant.

The computing device of the merchant may then employ or otherwise compare the reference identification code to the internally stored list of managing entity public keys to identify the managing entity public key assigned to the user, as shown at block 514. Because the merchant has already stored at least a portion of the repository locally on the computing device of the merchant, the computing device of the merchant is able to pull the reference identification code associated with the user from the received information and search the internal database to match the reference identification code with the associated managing entity public key assigned to the user. Because the mobile device of the user encrypted (and/or digitally signed) the second digital envelope using the managing entity private key assigned to the user using an asymmetric key encryption scheme, the merchant needs to have the paired managing entity public key of the user to decrypt (and/or verify) the second encrypted digital envelope. Since the reference identification code of the user is associated with this particular managing entity public and private key pair, the computing device of the merchant is able to identify the correct managing entity public key for the decryption (and/or verification) steps.

By matching the reference identification code to the managing entity public key of the user, the merchant is able to have improved confidence that that the managing entity private key used to encrypt the second digital envelope was issued by and supported by the managing entity (or whichever issuing institution actually generated the managing entity key pairing and authorized the transmission of the exchange token). As such, the merchant has confidence that the managing entity has already set aside an appropriate amount of resources to cover the exchange amount, and that the managing entity is guaranteeing the exchange amount.

If the merchant is unable to identify the managing entity public key in its internal database, the merchant may transmit a prompt back to the mobile device of the user requesting the use of an alternate managing entity private key for encryption. If the mobile device of the user has already received an alternate or additional managing entity private key and affiliated reference identification code (i.e., one that will point to the appropriate managing entity public key that is paired with this alternate managing entity private key), then the mobile device of the user can repeat block 508 and block 510 and use this additional managing entity private key for the asymmetric key encryption scheme for the second digital envelope.

At block 516, the computing device of the merchant decrypts the second encrypted envelope, using the identified managing entity public key assigned to the user. Because the managing entity public key stored in the internal database of the computing device of the merchant is the appropriate paired managing entity public key of the managing entity private key that was used to encrypt the second digital envelope using the asymmetric key encryption scheme, the computing device of the user is able to use this managing entity public key to decrypt (and/or verify) the second encrypted digital envelope and identify the contents of the second encrypted digital envelope.

Once the second encrypted digital envelope has been decrypted, the computing device of the merchant is able to identify the contents of the second digital envelope. As such, the process 500 may continue to block 518, where the computing device of the merchant identifies, from the decrypted second digital envelope, at least (1) the first encrypted envelope (which is still encrypted), (2) the exchange amount, (3) the exchange timestamp, (4) the time to live expiration arising out of the exchange timestamp, and (5) the hashed value of the first encrypted envelope's contents In some embodiments, at least a portion of the information that was decrypted may comprise the exchange prompt or other information that the merchant encrypted with the merchant's own private key and/or digitally signed with the merchant's own private key. In such embodiments, the computing device of the merchant may decrypt that information and/or verify that the information remains accurate and consistent since the exchange prompt was issued by utilizing the paired public key of the merchant.

The computing device of the merchant may then, as shown at block 520, determine whether the time to live expiration has been satisfied, and whether the exchange amount is acceptable. If a time to live expiration is not satisfied, then the computing device of the merchant can transmit a request for a new or updated second digital envelope from the user with a satisfied time to live expiration. Similarly, if the exchange amount is not acceptable, then the computing device of the merchant can transmit a request for a new or updated second digital envelope from the user with a different exchange amount.

As shown at block 522, the computing device of the merchant may transmit the first encrypted digital envelope, the hashed value of the first encrypted envelope's contents, and the reference identification code associated with the user (the "exchange information") to the managing entity system (or, in some embodiments, to a financial institution associated with the merchant, whereby that financial institution subsequently presents this information to the managing entity system) and requests settlement of the exchange. In embodiments where at least a portion of the exchange prompt is encrypted or digitally signed by a private key of the merchant, the merchant is able to decrypt and/or verify the accuracy and consistency of the merchant information by transmitting the merchant identification code associated with the key pair from which the private key of the merchant is associated, thereby permitting the managing entity system (or a third party system like a financial institution of the merchant) to match the merchant identification code with the appropriate public key of the merchant for the purpose of decrypting and/or verifying the information.

Of course, in embodiments where the computing device of the merchant has been offline, this step of transmitting the exchange information to the managing entity system may be performed once the computing device of the merchant has re-connected to a wide area network or otherwise is able to establish a communication channel with the managing entity system. In some embodiments, once the computing device of the merchant has received the exchange information and determined that the time to live expirations are satisfied, the computing device of the merchant may configure itself to automatically transmit the exchange information in response to the computing device of the merchant accessing a wide area network or otherwise establishing a communication channel with the managing entity system.

At block 524, the managing entity system may receive the transaction information and identify the user resource private key (i.e., the public key paired with the user resource public key) based on the received GUID. In such embodiments, the managing entity system may have access to (or otherwise store) a database of customer public keys that are associated with customer private keys that the managing entity system transmits to its customers (including the user), whereby each such key pair is also paired or otherwise linked with information about the computing device(s) that receive the customer private keys and/or the GUIDs that are assigned for each customer (including the user) and/or resource account.

The managing entity system, at block 526, may decrypt the first encrypted envelope using the user resource private key to identify the contents of (1) the exchange amount, (2) the exchange timestamp, (3) the time to live expiration arising out of the exchange timestamp, and (4) the information from the exchange prompt including any encrypted portion of the exchange prompt.

The managing entity system may then perform its unique hashing mechanism (e.g., a hashing algorithm) on the identified contents of the first envelope to determine an expected hashed value for the contents of the received first encrypted envelope. The process 500 may then proceed to block 528, where the managing entity system verifies an integrity of the first encrypted envelope by comparing the received hashed value of the first encrypted envelope to the expected hashed value of the contents of the received first encrypted envelope and the GUID. Additionally, in some embodiments, the managing entity system may have access to a public key of the merchant and can decrypt or verify a digital signature of the merchant (e.g., as applied to a portion of the exchange prompt) that used the paired private key of the merchant The managing entity can also confirm that the reference identification code(s) associated with the exchange information matches internal records for which reference identification codes were issued to which customers (including the user) and/or merchants.

In some embodiments, the managing entity system is part of (or comprises) a consortium of financial institutions, including a financial institution of the merchant. In such embodiments, the financial institution of the merchant may be the entity that receives the exchange information from the computing device of the merchant. In such embodiments, the financial institution of the merchant may possess the private and/or public key of the merchant and use these keys for certain verification and/or decryption processes to confirm the received information matches internal records for what constitutes a verified exchange for this merchant. Furthermore, in some embodiments, the financial institution of the merchant may strip any outer encryption layers for the exchange information and present the remainder of the second digital envelope to the managing entity system, another financial institution that is associated with the user (i.e., the financial institution that issued the managing entity private key assigned to the user to the mobile device of the user), or some other token processing system.

Finally, the managing entity system, at block 530, transmits the exchange amount from an account associated with the user to an account associated with the merchant. As the exchange amounts have already been accounted for by the managing entity system at the point in time when the user requested the amount of resources for offline exchange, the exchange amount is already set aside for such a transfer. Therefore, the managing entity system is able to transfer the exchange amount to the account of the merchant that is identified from the exchange information (e.g., information that was included in the original exchange prompt and carried through the encrypted envelope and other communication between the mobile device of the user and the computing device of the merchant. In this way, the use has securely executed an exchange with the merchant even though the computing devices associated with each party were offline at the time of the exchange.

Through these processes 400 and 500, the managing entity ensures or guarantees that a timely (i.e., within the time to live expiration) presented exchange token will be honored to the extent of the resources it references. This is true even though the mobile device of the user and the computing device of the merchant are both offline at the time of the exchange. Furthermore, these processes 400 and 500 protect sensitive information such as identifying information from being shared with other entities. For example, the supporting application programming interface on the mobile device of the user prevents identifying information of the mobile device of the user (e.g., device identification codes, phone number, and the like), from being transmitted at any time during the negotiations and exchanges described herein.

Referring now to FIG. 6, a flowchart is provided to illustrate one embodiment of a process 600 for resource distribution within an offline environment, in accordance with embodiments of the invention. In some embodiments, the process 600 may include block 602, where the system transmits a request to a managing entity system for an amount of resources for offline exchange.

As described herein, the mobile device of the user may comprise a wearable device comprising one or more of a near field communication tag, a radio frequency identification tag, and a Bluetooth tag. In some embodiments, the mobile device of the user is configured to interact (e.g., via a Bluetooth connection or some other near field communication network) with one or more third party computing devices (e.g., an automated teller machine of the managing entity, a computing device associated with another customer of the managing entity system, an Internet of things device, or the like) to have the third party computing device(s) make the request on the mobile device of the user's behalf. For example, the third party computing devices may have access to the Internet, a cloud application associated with the managing entity system, a mobile data network, or the like, and therefore can communicate the request to the managing entity system and transmit the resulting information back to the mobile device of the user without the mobile device of the user needing to access a mobile data network, the Internet, or any other wide area network.

In some embodiments, the process 600 includes block 604, where the system receives, from the managing entity system, (1) an authorization for the mobile device of the user to exchange the amount of resources for offline exchange, (2) a managing entity private key assigned to the user, (3) a reference identification code mapped to both a managing entity public key assigned to the user and the corresponding managing private key assigned to the user, (4) a user resource public key, and (5) a time to live mechanism for exchanges.

The mobile device of the user may be configured to internally store the received authorization for the mobile device of the user to exchange the amount of resources for offline exchange, the managing entity private key assigned to the user, the reference identification code associated with the managing entity public key assigned to the user that is paired with the managing entity private key assigned to the user, the user resource public key, and the time to live mechanism for exchanges within a managing entity application.

To ensure that the user remains authenticated to utilize the offline exchange capability, the system may continuously monitor a code signature of the managing entity application to determine whether the code signature of the managing entity application has been altered. In response to determining that the code signature of the managing entity application has been altered, the system may prohibit use of the mobile device of the user for offline exchange. Alternatively, in response to determining that the code signature of the managing entity application has not been altered, the system may permit use of the mobile device of the user for offline exchange (i.e., for as long as the code signature remains unaltered).

Additionally, in some embodiments, the process 600 includes block 606, where the system receives, from a computing device of a merchant via a near field communication channel, an exchange prompt comprising an exchange amount and information about a proposed exchange between the user and the merchant.

The exchange prompt may, in some embodiments, comprise a merchant identification code that is associated with a public key associated with the merchant. In such embodiments, the exchange prompt may be encrypted by a private key of the merchant that is paired with the public key associated with the merchant. The managing entity system (or a third party system) may generate these paired public and private keys, and provide the mobile device of the user (and computing devices of other customers of the managing entity system) with access to a database that links merchant identification codes with associated public keys. This database may be the same type of database, and function in a similar way, to the repository of managing entity public keys and reference identification codes associated with the customers (including the user). As such, the step of receiving the exchange prompt may further comprise a step of matching the merchant identification code with the public key associated with the merchant in an internal database and then decrypting the exchange prompt using the public key associated with the merchant.

In some embodiments, the system may define an amount to be exchanged that may be different from the amount initially requested from the computing device of the merchant in the exchange prompt. In such embodiments, the system is setting the value of the exchange amount (e.g., through user input or an automatic execution by the managing entity application on the mobile device) such that when the exchange amount is subsequently presented to the managing entity system for disbursement, the value of resources that are exchanged under this process 600 will meet this exchange amount. In some embodiments, the exchange amount may automatically be exactly the same as the exchange amount of the exchange prompt. In other embodiments, the system may prompt the user (e.g., via a display on the mobile device of the user) to request a user input of a new amount of the exchange amount. For example, the prompt may include a request for the user to enter the amount that the user would like to exchange, and this amount may be inclusive or exclusive of any tip amounts, tax amounts, or the like, the inclusion or exclusion of which the user may have control over.

In some embodiments, the process 600 includes block 608, where the system generates a first digital envelope comprising (1) the exchange amount, (2) an exchange timestamp, (3) a time to live expiration based on the exchange timestamp and the time to live mechanism for exchanges, and (4) information from the exchange. The system may then encrypt the first digital envelope using the user resource public key, as shown at block 610.

Additionally, in some embodiments, the process 600 includes block 612, where the system generates a second digital envelope comprising (1) the encrypted first digital envelope, (2) the exchange amount, (3) the exchange timestamp, (4) the time to live expiration, and (6) a hashed value of the encrypted first digital envelope's contents generated with a hashing mechanism known to the managing entity system. The system may then encrypt this second digital envelope using the managing entity private key assigned to the user, as shown at block 614. This second digital envelope may be referred to as an "exchange token."

The process 600 may include block 616, where the system transmits the encrypted second digital envelope and the reference identification code to the computing device of the merchant via the near field communication channel. In some embodiments, the system may also transmit additional information to the computing device of the merchant (e.g., an identity of the managing entity for the purpose of assisting the computing device of the merchant in identifying where to employ the reference identification code).

In some embodiments, the computing device of the merchant may be configured to (or instructed to) perform one or more process steps in addition to the steps illustrated in FIG. 6. For example, the computing device of the merchant may be configured to receive the encrypted second digital envelope and the reference identification code.

Additionally, the computing device of the merchant may employ (e.g., compare) the reference identification code to a repository of managing entity public keys and associated reference identification codes to identify the managing entity public key assigned to the user.

The computing device of the merchant may then decrypt the encrypted second digital envelope using the managing entity public key of the user to identify (1) the first encrypted envelope, (2) the exchange amount, (3) the exchange timestamp, (4) the time to live expiration arising out of the exchange timestamp, and (5) the hashed value of the first encrypted envelope's contents.

In some embodiments, the computing device of the merchant may determine that the time to live expiration is satisfied and determine that the exchange amount is enough for the proposed exchange between the user and the merchant. If the computing device of the merchant cannot make these determinations, then the computing device of the merchant may cause an alert to be presented on a display of the computing device of the merchant to inform the merchant that the exchange should not proceed as it is not fully authorized. In such embodiments, the merchant can decline the exchange with the user and the amount associated with the token is not acquired by the merchant.

In embodiments where the computing device is able to make both determinations, then the computing device of the merchant may transmit the first encrypted envelope, the hashed value of the first encrypted envelope's contents, and the reference identification code associated with the user to the managing entity system, whereby the managing entity system is configured to verify an integrity of the encrypted first digital envelope based on the hashed value and subsequently transmit the exchange amount from an account of the user to an account of the merchant.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for resource distribution within an offline environment, the system comprising a mobile device associated with a user comprising:
   a memory device; and
   a processing device operatively coupled to the memory device, wherein the processing device is configured to execute computer-readable program code to:
   transmit a request to a managing entity system for an amount of resources for offline exchange;
   receive, from the managing entity system via a managing entity application, (1) an authorization for the mobile device of the user to exchange the amount of resources for offline exchange, wherein the mobile device of the user comprises a wearable device comprising one or more of a near field communication tag, a radio frequency identification tag, and a Bluetooth tag, (2) a managing entity private key assigned to the user, (3) a reference identification code associated with a managing entity public key assigned to the user that is paired with the managing entity private key assigned to the user, (4) a user resource public key, and (5) a time to live mechanism for exchanges;
   receive, from a computing device of a merchant via a near field communication channel, an exchange prompt comprising an exchange amount and information about a proposed exchange between the user and the merchant;
   monitor a code signature of the managing entity application to determine whether the code signature of the managing entity application has been altered;
   generate, upon identifying the code signature of the managing application not being altered, a first digital envelope comprising (1) the exchange amount, (2) an exchange timestamp, (3) a time to live expiration based on the exchange timestamp and the time to live mechanism for exchanges, and (4) information from the exchange prompt;
   encrypt the first digital envelope using the user resource public key to create an encrypted first digital envelop;
   generate a second digital envelope comprising (1) the encrypted first digital envelope, (2) the exchange amount, (3) the exchange timestamp, (4) the time to live expiration, and (5) a hashed value of contents of the encrypted first digital envelope generated with a hashing mechanism known to the managing entity system;
   encrypt the second digital envelope using the managing entity private key assigned to the user to create an encrypted second digital envelop; and
   transmit the encrypted second digital envelope and the reference identification code to the computing device of the merchant via the near field communication channel and provide the computing device of the merchant with instructions on employing the reference identification code, wherein the computing device of the merchant comprises:
   a memory device of the computing device of the merchant; and
   a processing device of the computing device of the merchant operatively coupled to the memory device of the computing device of the merchant, wherein the processing device of the computing device of the merchant is configured to execute computer-readable code to:

receive the encrypted second digital envelope and the reference identification code;

employ the reference identification code to an internally-stored repository of public keys and associated reference identification codes to identify the managing entity public key assigned to the user;

decrypt the encrypted second digital envelope using the managing entity public key assigned to the user to identify (1) the encrypted first digital envelope, (2) the exchange amount, (3) the exchange timestamp, (4) the time to live expiration, and (5) the hashed value of the encrypted first digital envelope's contents generated with a hashing mechanism known to the manacling entity system;

determine that the time to live expiration is satisfied;

determine that the exchange amount is sufficient for the proposed exchange between the user and the merchant; and transmit the encrypted first digital envelope and the hashed value of the encrypted first envelope's contents to the managing entity system, whereby the managing entity system is configured to verify an integrity of the encrypted first digital envelope based on the hashed value and subsequently transmit the exchange amount from an account of the user to an account of the merchant.

2. The system of claim 1, wherein the processing device is further configured to execute computer-readable program code to:

store the received (1) authorization for the mobile device of the user to exchange the amount of resources for offline exchange (2) managing entity private key assigned to the user, (3) reference identification code associated with a managing entity public key assigned to the user that is paired with the managing entity private key assigned to the user, (4) user resource public key, and (5) time to live mechanism for exchanges within a managing entity application;

monitor a code signature of the managing entity application to determine whether the code signature of the managing entity application has been altered; and in response to determining that the code signature of the managing entity application has been altered, prohibit use of the mobile device of the user for offline exchange.

3. The system of claim 1, wherein the exchange prompt further comprises a merchant identification code that is associated with a public key associated with the merchant.

4. The system of claim 3, wherein the exchange prompt is encrypted by a private key of the merchant that is paired with the public key associated with the merchant.

5. The system of claim 4, wherein receiving the exchange prompt further comprises matching the merchant identification code with the public key associated with the merchant in an internal database and decrypting the exchange prompt using the public key associated with the merchant.

6. A computer program product for resource distribution within an offline environment, the computer program product comprising at least one non-transitory computer readable medium comprising computer readable instructions, the instructions comprising instructions for:

transmitting a request to a managing entity system for an amount of resources for offline exchange;

receiving, from the managing entity system via a managing entity application, (1) an authorization for the mobile device of the user to exchange the amount of resources for offline exchange, wherein the mobile device of the user comprises a wearable device comprising one or more of a near field communication tag, a radio frequency identification tag, and a Bluetooth tag, (2) a managing entity private key assigned to the user, (3) a reference identification code associated with a managing entity public key assigned to the user that is paired with the managing entity private key assigned to the user, (4) a user resource public key, and (5) a time to live mechanism for exchanges;

receiving, from a computing device of a merchant via a near field communication channel, an exchange prompt comprising an exchange amount and information about a proposed exchange between the user and the merchant;

monitoring a code signature of the managing entity application to determine whether the code signature of the managing entity application has been altered;

generating, upon identifying the code signature of the managing application not being altered, a first digital envelope comprising (1) the exchange amount, (2) an exchange timestamp, (3) a time to live expiration based on the exchange timestamp and the time to live mechanism for exchanges, and (4) information from the exchange prompt;

encrypting the first digital envelope using the user resource public key to create an encrypted first digital envelop;

generating a second digital envelope comprising (1) the encrypted first digital envelope, (2) the exchange amount, (3) the exchange timestamp, (4) the time to live expiration, and (5) a hashed value of contents of the encrypted first digital envelope generated with a hashing mechanism known to the managing entity system;

encrypting the second digital envelope using the managing entity private key assigned to the user to create an encrypted second digital envelop;

and transmitting the encrypted second digital envelope and the reference identification code to the computing device of the merchant via the near field communication channel and provide the computing device of the merchant with instructions on employing the reference identification code, wherein the computing device of the merchant comprises computer readable instructions further comprise instructions for:

receiving the encrypted second digital envelope and the reference identification code;

employing the reference identification code to an internally-stored repository of public keys and associated reference identification codes to identify the managing entity public key assigned to the user;

decrypting the encrypted second digital envelope using the managing entity public key assigned to the user to identify (1) the encrypted first digital envelope, (2) the exchange amount, (3) the exchange timestamp, (4) the time to live expiration, and (5) the hashed value of the encrypted first digital envelope's contents generated with a hashing mechanism known to the managing entity system;

determining that the time to live expiration is satisfied;

determining that the exchange amount is sufficient for the proposed exchange between the user and the merchant; and transmitting the encrypted first digital envelope and the hashed value of the encrypted first envelope's contents to the managing entity system, whereby the managing entity system is configured to verify an integrity of the encrypted first digital envelope based on the hashed value and subsequently transmit the exchange amount from an account of the user to an account of the merchant.

7. The computer program product of claim 6, wherein the computer readable instructions further comprise instructions for:
storing the received (1) authorization for the mobile device of the user to exchange the amount of resources for offline exchange (2) managing entity private key assigned to the user, (3) reference identification code associated with a managing entity public key assigned to the user that is paired with the managing entity private key assigned to the user, (4) user resource public key, and (5) time to live mechanism for exchanges within a managing entity application;
monitoring a code signature of the managing entity application to determine whether the code signature of the managing entity application has been altered; and
in response to determining that the code signature of the managing entity application has been altered, prohibiting use of the mobile device of the user for offline exchange.

8. The computer program product of claim 6, wherein the exchange prompt further comprises a merchant identification code that is associated with a public key associated with the merchant.

9. The computer program product of claim 8, wherein the exchange prompt is encrypted by a private key of the merchant that is paired with the public key associated with the merchant.

10. The computer program product of claim 9, wherein receiving the exchange prompt further comprises matching the merchant identification code with the public key associated with the merchant in an internal database and decrypting the exchange prompt using the public key associated with the merchant.

11. A computer implemented method for resource distribution within an offline environment, said computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:
transmitting a request to a managing entity system for an amount of resources for offline exchange;
receiving, from the managing entity system via a managing entity application, (1) an authorization for the mobile device of the user to exchange the amount of resources for offline exchange, wherein the mobile device of the user comprises a wearable device comprising one or more of a near field communication tag, a radio frequency identification tag, and a Bluetooth tag, (2) a managing entity private key assigned to the user, (3) a reference identification code associated with a managing entity public key assigned to the user that is paired with the managing entity private key assigned to the user, (4) a user resource public key, and (5) a time to live mechanism for exchanges;
receiving, from a computing device of a merchant via a near field communication channel, an exchange prompt comprising an exchange amount and information about a proposed exchange between the user and the merchant;
monitoring a code signature of the managing entity application to determine whether the code signature of the managing entity application has been altered;
generating, upon identifying the code signature of the managing application not being altered, a first digital envelope comprising (1) the exchange amount, (2) an exchange timestamp, (3) a time to live expiration based on the exchange timestamp and the time to live mechanism for exchanges, and (4) information from the exchange prompt;
encrypting the first digital envelope using the user resource public key to create an encrypted first digital envelop;
generating a second digital envelope comprising (1) the encrypted first digital envelope, (2) the exchange amount, (3) the exchange timestamp, (4) the time to live expiration, and (5) a hashed value of contents of the encrypted first digital envelope generated with a hashing mechanism known to the managing entity system;
encrypting the second digital envelope using the managing entity private key assigned to the user to create an encrypted second digital envelop;
transmitting the encrypted second digital envelope and the reference identification code to the computing device of the merchant via the near field communication channel and provide the computing device of the merchant with instructions on employing the reference identification code;
receiving the encrypted second digital envelope and the reference identification code;
employing the reference identification code to an internally-stored repository of public keys and associated reference identification codes to identify the managing entity public key assigned to the user;
decrypting the encrypted second digital envelope using the managing entity public key assigned to the user to identify (1) the encrypted first digital envelope, (2) the exchange amount, (3) the exchange timestamp, (4) the time to live expiration, and (5) the hashed value of the encrypted first digital envelope's contents generated with a hashing mechanism known to the manacling entity system;
determining that the time to live expiration is satisfied;
determining that the exchange amount is sufficient for the proposed exchange between the user and the merchant; and
transmitting the encrypted first digital envelope and the hashed value of the encrypted first envelope's contents to the managing entity system, whereby the managing entity system is configured to verify an integrity of the encrypted first digital envelope based on the hashed value and subsequently transmit the exchange amount from an account of the user to an account of the merchant.

12. The computer implemented method of claim 11, further comprising:
storing the received (1) authorization for the mobile device of the user to exchange the amount of resources for offline exchange (2) managing entity private key assigned to the user, (3) reference identification code associated with a managing entity public key assigned to the user that is paired with the managing entity private key assigned to the user, (4) user resource public key, and (5) time to live mechanism for exchanges within a managing entity application;

monitoring a code signature of the managing entity application to determine whether the code signature of the managing entity application has been altered; and in response to determining that the code signature of the managing entity application has been altered, prohibiting use of the mobile device of the user for offline exchange.

13. The computer implemented method of claim 11, wherein the exchange prompt further comprises a merchant identification code that is associated with a public key associated with the merchant.

14. The computer implemented method of claim 13, wherein the exchange prompt is encrypted by a private key of the merchant that is paired with the public key associated with the merchant.

15. The computer implemented method of claim 14, wherein receiving the exchange prompt further comprises matching the merchant identification code with the public key associated with the merchant in an internal database and decrypting the exchange prompt using the public key associated with the merchant.

* * * * *